US006334031B1

(12) United States Patent
Takahashi

(10) Patent No.: US 6,334,031 B1
(45) Date of Patent: Dec. 25, 2001

(54) CAMERA HAVING A DATA IMPRINTING DEVICE

(75) Inventor: Hiroyuki Takahashi, Tochigi (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,066

(22) Filed: Oct. 7, 1999

(30) Foreign Application Priority Data

Oct. 7, 1998 (JP) .................................................. 10-285344

(51) Int. Cl.$^7$ .............................. G03B 17/24; G03B 1/00
(52) U.S. Cl. ........................... 396/315; 396/318; 396/406
(58) Field of Search .................................... 396/310, 311, 396/315–320, 406, 410

(56) References Cited

U.S. PATENT DOCUMENTS 5,469,237 * 11/1995 Itoh et al. ............................ 396/315
5,862,421    1/1999 Suzuki et al. .

FOREIGN PATENT DOCUMENTS 4-9021     1/1992 (JP) .
7-287293  10/1995 (JP) .

* cited by examiner

Primary Examiner—David M. Gray
(74) Attorney, Agent, or Firm—Greenblum & Bernstein, P.L.C.

(57) ABSTRACT

A camera having a data imprinting function, includes: a sprocket-hole detecting device for detecting when each consecutive sprocket hole of a film passes a predetermined position while the film is wound or rewound, the film being loaded into the camera; a data imprinting device for imprinting data on the film between two adjacent sprocket holes thereof; a film speed detecting device for detecting the speed of the film; and a controller for controlling the position of commencement of imprinting the data on the film between the two adjacent sprocket holes in accordance with the time of detection of the sprocket-hole detecting device and the film speed detected by the film speed detecting device.

20 Claims, 17 Drawing Sheets

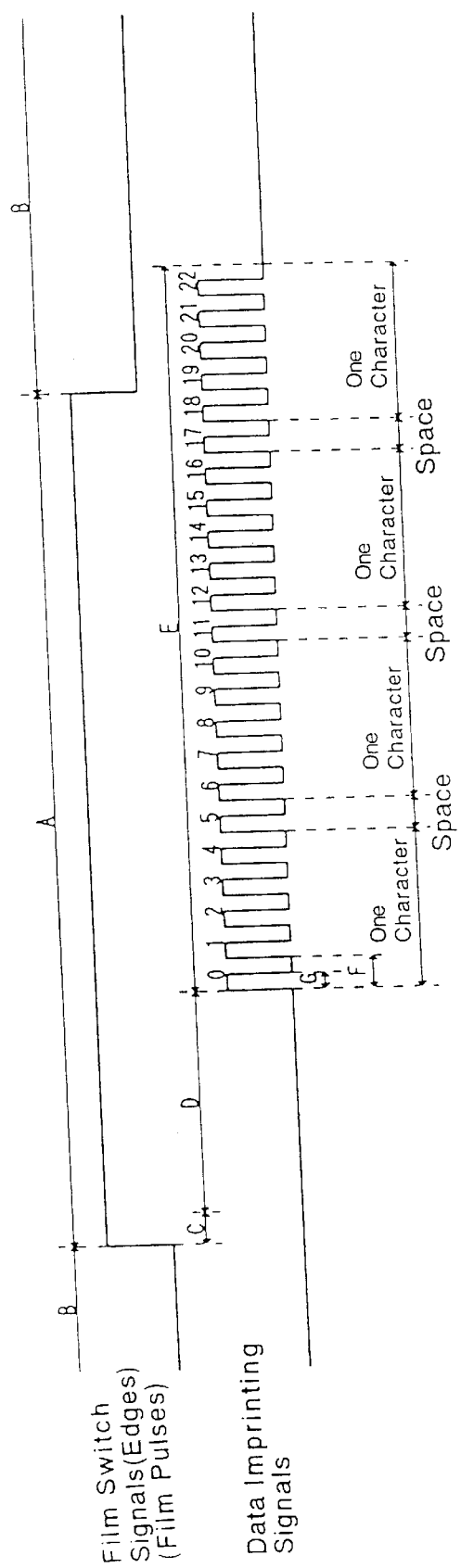

CAMERA HAVING A DATA IMPRINTING DEVICE

BACKGROUND OF THE INVENTION

1. Field of the Invention

The present invention relates to a camera provided with a data imprinting device for imprinting photographic data such as a date, time, shutter speed, aperture value, etc., on film.

2. Description of the Related Art

A camera provided with a data imprinting device for imprinting photographic data such as a date, time, shutter speed, aperture value, etc., on film at the time of winding or rewinding the film is known in the art. Such a data imprinting device is generally provided with an LED light emitter having multiple-dots (e.g. 7 dots) of tiny LEDs aligned vertically to emit light in accordance with character information. In order to improve the quality of character patterns imprinted on the film, such a conventional camera is usually provided with a device which keeps the period of emission of the multiple-dots (data imprinting period) constant to thereby keep the width of each imprinted character pattern exposed on the film constant. However, in such a conventional camera having such a device, although the width of each imprinted character pattern exposed on the film can be kept constant, the position of imprinting character patterns on the film is not always the same because the imprinting position on the film is not controlled by software. Furthermore, in such a conventional camera, in order to keep the width of each imprinted character pattern exposed on film constant, it is compulsory to adjust a mechanism associated with the data imprinting device during the assembly of the camera, which is a troublesome and time-consuming operation.

SUMMARY OF THE INVENTION

The primary object of the present invention is to provide a camera having a data imprinting device for imprinting photographic data on film between two adjacent sprocket holes thereof, wherein the quality of character patterns imprinted on film is improved while parameters associated with the data imprinting operation can be easily changed. Other objects of the present invention will become apparent to one skilled in the art from the following disclosure and the appended claims.

To achieve the object mentioned above, according to an aspect of the present invention, there is provided a camera having a data imprinting function, including: a sprocket-hole detecting device for detecting when each consecutive sprocket hole of a film passes a predetermined position while the film is wound or rewound, the film being loaded into the camera; a data imprinting device for imprinting data on the film between two adjacent sprocket holes thereof; a film speed detecting device for detecting the speed of the film; and a controller for controlling the position of commencement of imprinting the data on the film between the two adjacent sprocket holes in accordance with the time of detection of the sprocket-hole detecting device and the film speed detected by the film speed detecting device.

Preferably, the film speed detecting device detects the film speed in accordance with a time interval between two adjacent sprocket holes detected by the sprocket-hole detecting device.

Preferably, the controller utilizes a first delay time and a second delay time in order to control the commencement position of imprinting the data; the first delay time including the amount of time necessary for converting a predetermined number of characters which are to be imprinted between the two adjacent sprocket holes;

wherein the sum of the first and second delay times determines a reference delay time.

Preferably, the reference delay time is adjusted according to the ratio of the film speed detected by the film speed detecting device and a predetermined reference film speed.

Preferably, the controller controls the commencement position of imprinting the data in accordance with one of a plurality of edges of consecutive sprocket holes of the film which is detected by the film speed detecting device.

Preferably, one of the consecutive edges is one of the two edges of an area on the film between a first sprocket hole and a second sprocket hole immediately before an area in which the data starts to be imprinted on the film between the second sprocket hole and a third sprocket hole.

Preferably, a non-volatile memory is also included, in which data of the predetermined reference film speed and data of the first and second delay times are stored.

Preferably, the imprinting device includes an imprinting function wherein a unit of data which is to be imprinted on the film is divided into a plurality of columns, wherein the plurality of columns are imprinted column by column on the film between the two adjacent sprocket holes along a direction of movement of the film.

The data can imprinted on the film when the film is being rewound or wound.

Preferably, the plurality of columns of the unit of data are imprinted on the film, column by column, periodically at a predetermined period in accordance with the film speed.

Preferably, the predetermined period is based on a reference period at the predetermined reference film speed and the film speed detected by the film speed detecting device.

Preferably, a non-volatile memory is also included in which data of the reference period is stored.

Preferably, a plurality of data is imprinted on each frame of the film by the data imprinting device, each of the plurality of data being imprinted in a corresponding area between corresponding two adjacent sprocket holes on the each frame by the data imprinting device; wherein the camera further includes a controller for controlling a selection of a data-imprinting trigger edge, from which the data imprinting device first imprints the data for each frame of the film, between two adjacent sprocket holes on the each frame.

Preferably, a non-volatile memory is included in which data of the a data-imprinting trigger edge on each frame of the film and data of the number of areas in which the plurality of data are respectively imprinted are stored.

Preferably, the data imprinting device includes an LED light emitter having an array of multiple-dots.

Preferably, a sprocket is also included which is provided at least one end thereof with a plurality of projections extending radially and outwardly at regular intervals, wherein at least one of the plurality of projections being engaged with any of the sprocket holes of the film 14 at any time; wherein each of the sprocket-hole detecting device and the film speed detecting device includes a common detector for detecting rotation of the sprocket.

Preferably, the controller includes a CPU.

Preferably, the second delay time is determined in accordance with a reference delay time which is determined so that the data starts to be imprinted from a predetermined position on the film between the two adjacent sprocket holes at a predetermined reference film speed, and a ratio of the film speed detected by the film speed detecting device to the predetermined reference film speed.

The present disclosure relates to subject matter contained in Japanese Patent Application No.10-285344 (filed on Oct. 7, 1998) which is expressly incorporated herein by reference in its entirety.

BRIEF DESCRIPTION OF THE DRAWINGS

The present invention will be described below in detail with reference to the accompanying drawings in which:

FIG. 15 is an enlarged view of part of the time chart shown in FIG. 14; and

DESCRIPTION OF THE PREFERRED EMBODIMENT

Figure 1:
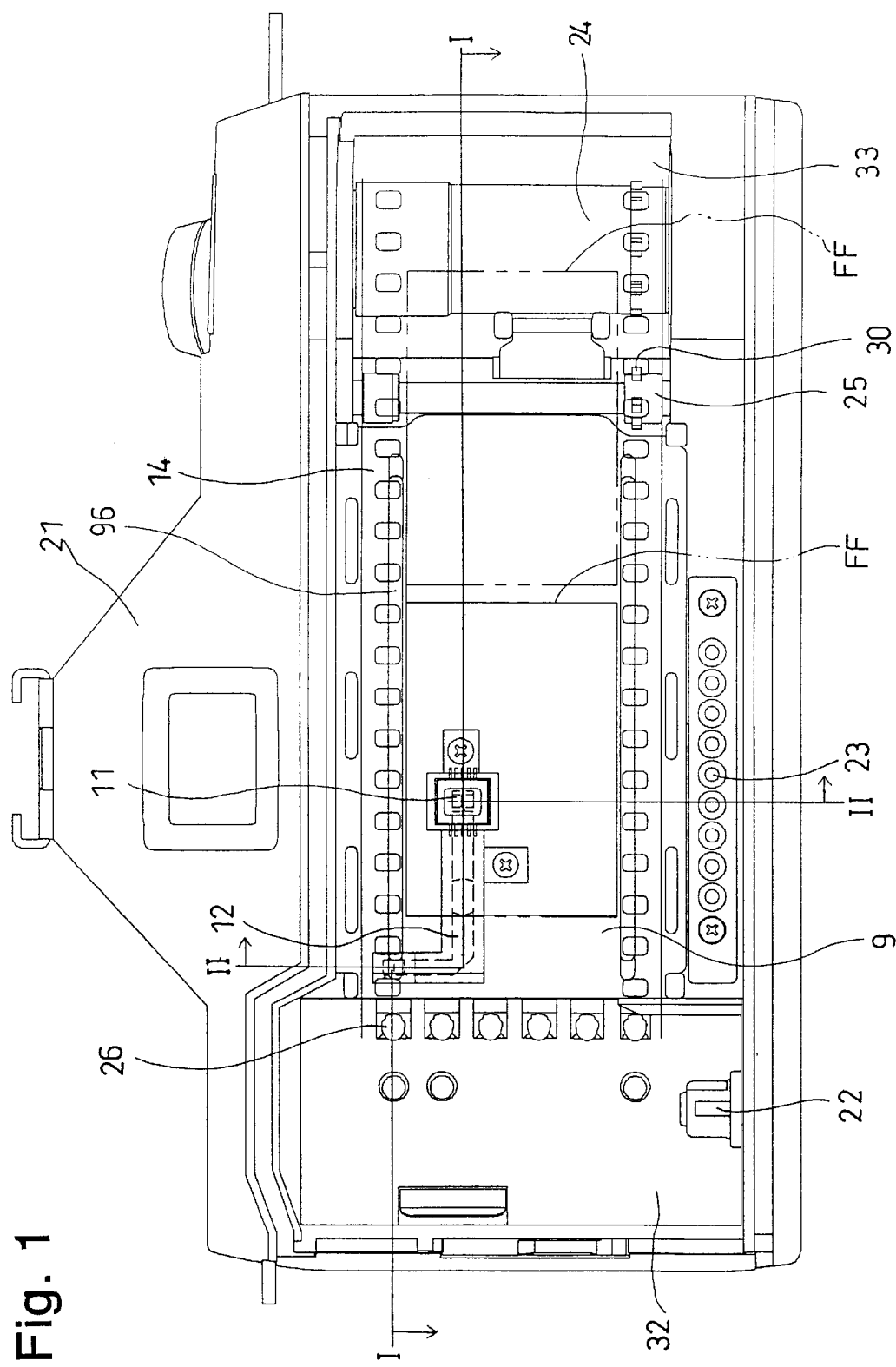
FIG. 1 is a rear elevational view of a camera to which the present invention is applied with the back lid of the camera open.
Figure 2:
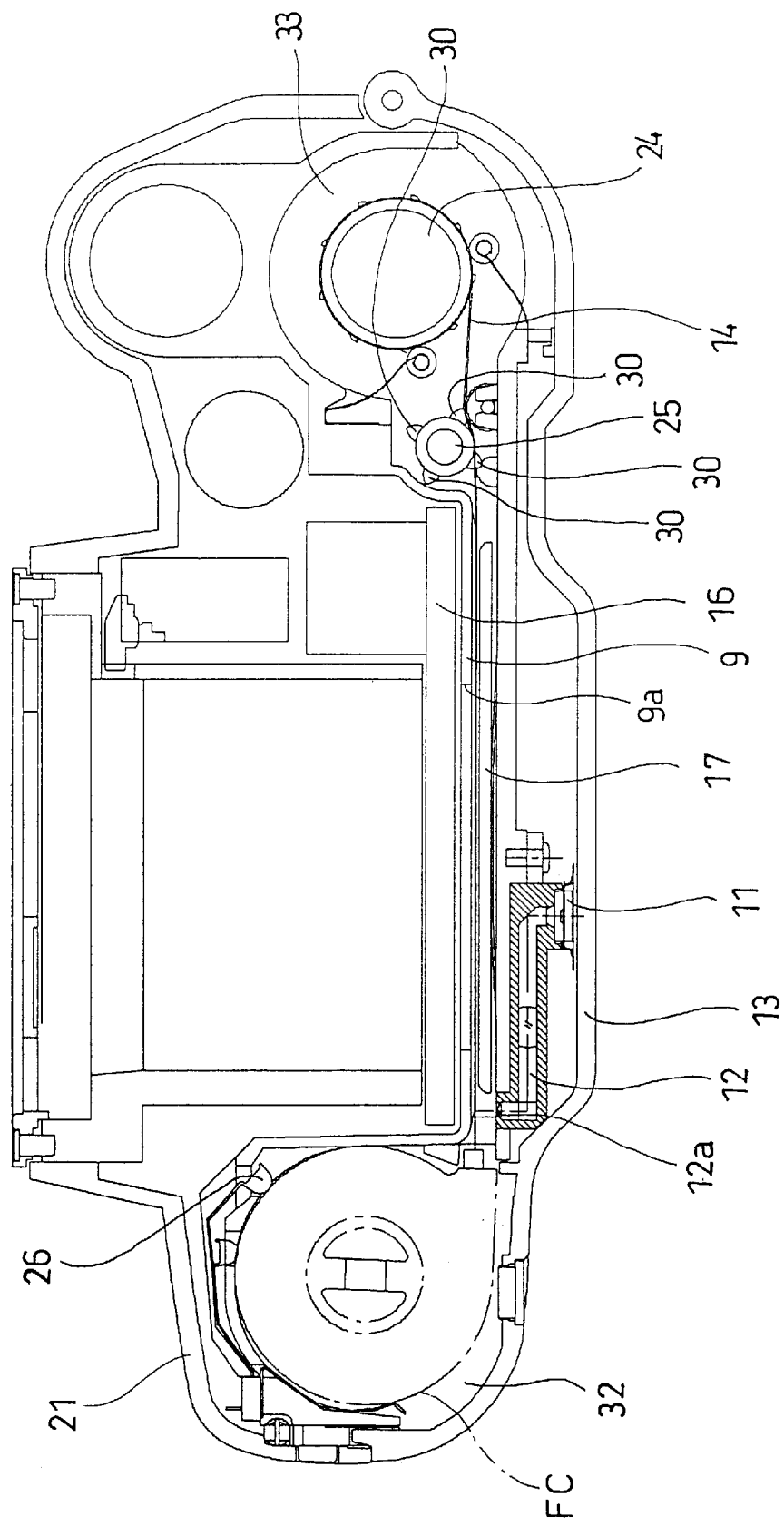
FIG. 2 is a cross sectional view of the camera shown in FIG. 1, taken along the I—I line, viewed in the direction of the appended arrows.
Figure 3:
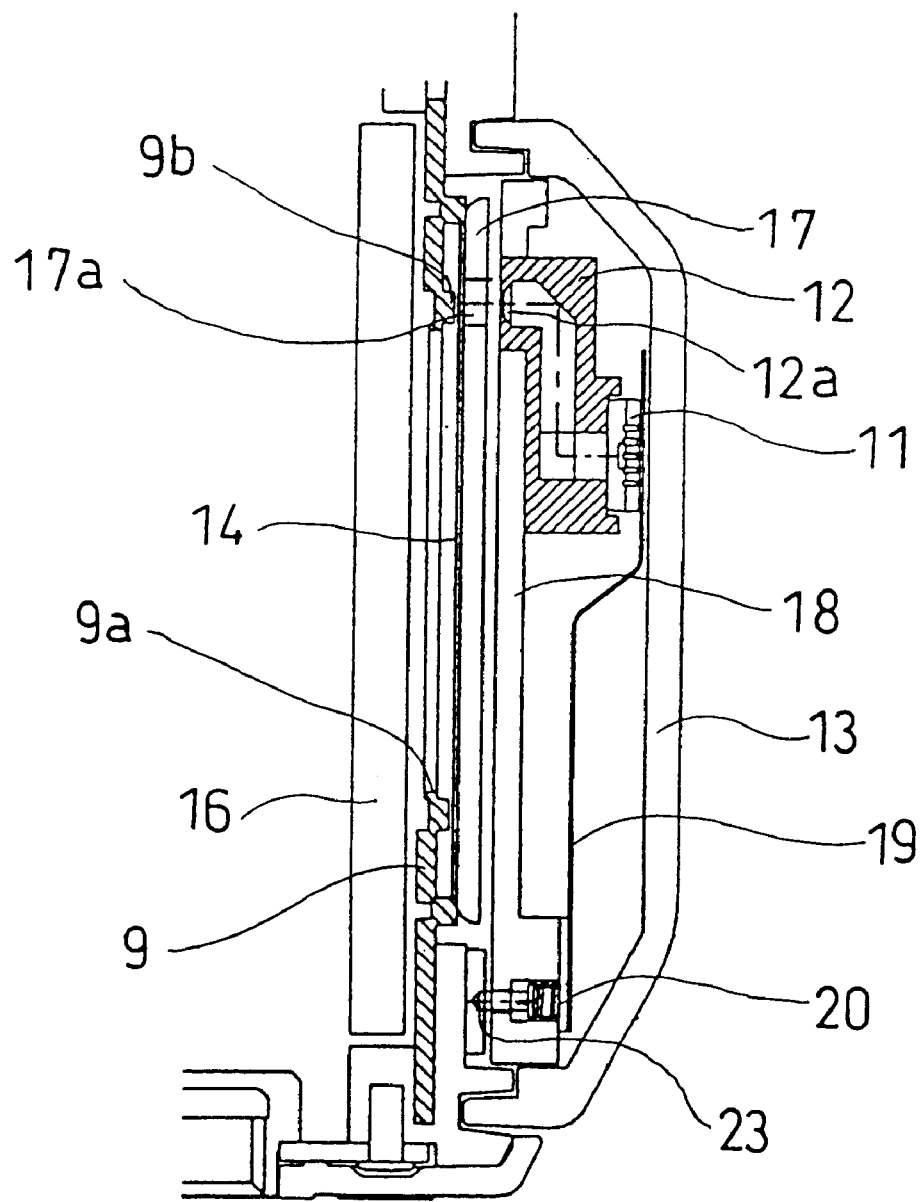
FIG. 3 is a cross sectional view of the camera shown in FIG. 1, taken along the II—II line, viewed in the direction of the appended arrows.

FIG. 1 shows an embodiment of an SLR camera with the back lid thereof open. The SLR camera is provided with an electronic control circuit which controls the exposure operation, the shutter release operation and other operations of the camera. The SLR camera is provided with a data imprinting device which is composed of an LED character generator 11 and a light-guide optical system 12. Although the data imprinting device is mounted on the back lid 13 (see FIG. 2) which is rotatably connected to a camera body 21, the data imprinting device is shown in FIG. 1 for the purpose of illustration. FIG. 2 is a cross sectional view of the camera, taken along the I—I line, viewed in the direction of the appended arrows. The camera body 21 is provided at the left and right ends thereof with a film chamber 32 and a spool chamber 33, respectively, as viewed in FIG. 1. A film cartridge FC, shown by a one-dot chain line in FIG. 2, is loaded in the film chamber 32, while a film take-up spool 24 is positioned in the spool chamber 33. The camera is provided in the film chamber 32 with a rewind shaft 22 and DX-information pins 26. The total number of DX-information pins 26 are nine; the right row includes six pins and the left row includes three pins as viewed in FIG. 1. A sprocket 25 which is engaged with sprocket holes of a film (roll film) 14 to detect the movement of the sprocket holes is positioned on the immediate left side of the spool chamber 33 as viewed in FIG. 1, so that the upper and lower ends of the sprocket 25 are rotatably held by the camera body 21. The camera is provided between the film chamber 32 and the spool chamber 33 with a shutter unit 16 (see FIG. 2). The camera is further provided, in the back of the camera body 21 at a lower center thereof, with an array of contacts 23. The back lid 13 is provided with a corresponding array of pins 20 (only one of them is shown in FIG. 3) which are brought into contact with the array of contacts 23 upon the back lid 13 being closed. Electrical signals can be sent from the camera body 21 to the back lid 13 and vice versa via the array of contacts 23 and the array of pins 20.

FIG. 3 shows a cross sectional view of part of the camera with the back lid 13 being closed, viewed from the left side of the camera as viewed in FIG. 1. The back lid 13 is provided with a pressure plate 17 which maintains the flatness of the film 14, and a base plate 18. The back lid 13 is further provided between the base plate 18 and the back lid 13 with the LED character generator 11 and the light-guide optical system 12, which are fundamental elements of the data imprinting device. The character generator 11 is provided with an LED light emitter having multiple-dots (e.g. 7 dots) aligned vertically to emit light in accordance with character information. The light-guide optical system 12 leads the light emitted by the character generator 11 to a character imprinting portion 12a (the exit surface of the light-guide optical system 12). The light-guide optical system 12 is provided with a plurality of reflecting surfaces which change the arrangement of the array of multiple-dots to an appropriate arrangement at an imprinting position on the film 14. A tiny window or opening (see FIG. 3) 17a is formed on the pressure plate 17 at a position opposed to an upper inner film guide rail 9b formed on an aperture frame 9 having a rectangular photographic aperture 9a. The upper inner film guide rail 9b is formed on the aperture frame 9 so that the sprocket holes formed on the upper side of the film 14 therealong as viewed in FIG. 1 travel on the upper inner film guide rail 9b. As can be seen in FIG. 3, the character imprinting portion 12a of the light-guide optical system 12 is positioned behind the tiny window 17a.

Figure 5:
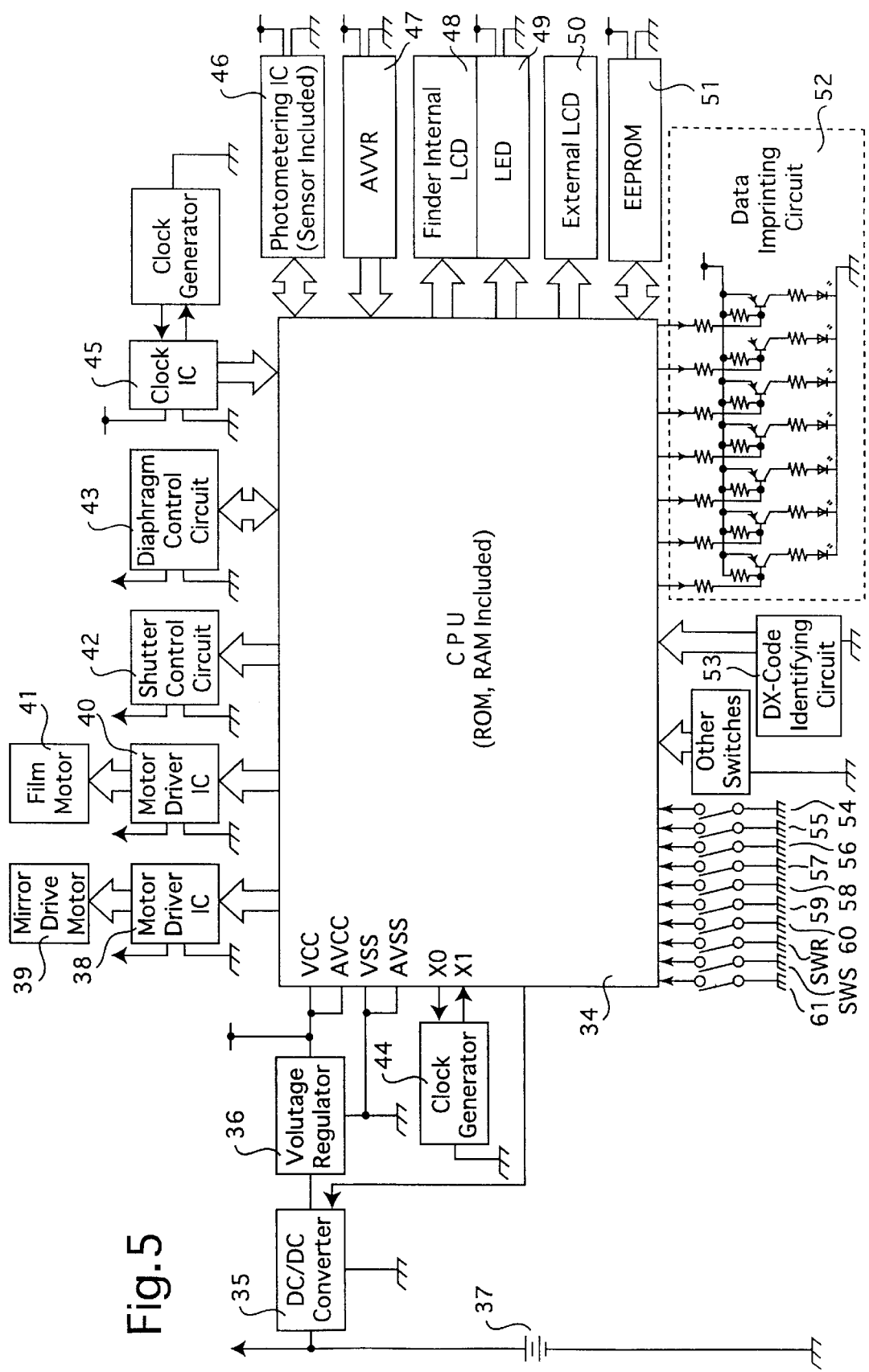
FIG. 5 is a block diagram of a control circuit of the camera shown in FIG. 1.

The character generator 11 emits light to be projected towards the film 14 between two adjacent sprocket holes to be exposed thereon in accordance with character information output from a CPU 34 (see FIG. 5). The emitted light carries a certain image of a pattern of characters and is incident on the back of the film 14 via the light-guide optical system 12 and the tiny window 17a to thereby imprint the photographic data on the film 14 as a latent image.

The back lid 13 is provided in a lower portion thereof with the aforementioned array of pins 20. These pins 20 are electrically connected with the character generator 11 via a flexible wiring board 19 (see FIG. 3) so that electrical signals can be sent from the camera body 21 to the character generator 11 via the flexible wiring board 19, the array of pins 20 and the array of contacts 23.

Figure 4:
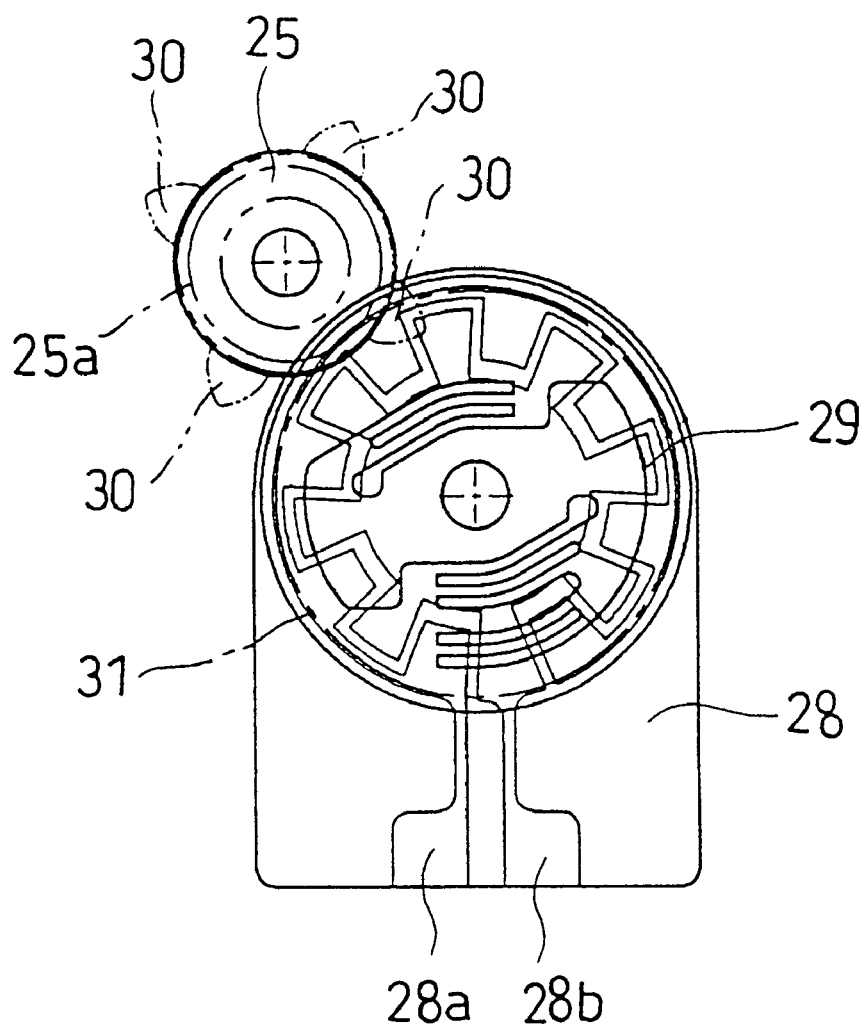
FIG. 4 is a plan view of a sprocket-hole detecting device of the camera shown in FIG. 1.

Referring to FIG. 4, the sprocket 25 is provided around the lower end thereof with four projections 30 which extend radially and outwardly at regular intervals. At least one of the four projections 30 is engaged with any sprocket hole of the film 14 (see FIG. 2) at a time, so that the sprocket 25 rotates while the film 14 is wound or rewound. The sprocket 25 is provided at one end thereof with a gear 25 which is in constant mesh with a gear 25a to which a brush 29 is fixed. The brush 29 is positioned on a detector board 28 to contact a predetermined code pattern printed thereon. Therefore, rotation of the sprocket 25 causes the brush 29 to rotate and slide on the code pattern of the detector board 28. With this mechanism, rotation of the sprocket 25 is detected. Each time the brush 29 rotates by a predetermined angle of rotation, two output terminals 28a and 28b on the detector board 28 are electrically connected and disconnected alternately. One of the output terminals 28a and 28b is grounded, so that the level of the signal output from the other output terminal alternately changes between a high level and a low level; this electric device is hereinafter referred to as film switch 58 (see FIG. 5). The CPU 34 (which functions as a film speed detecting device) detects the variation in level of the signal output from the other output terminal 28a or 28b as pulses (film pulses) generated by the movement of the film 14.

Figure 14:
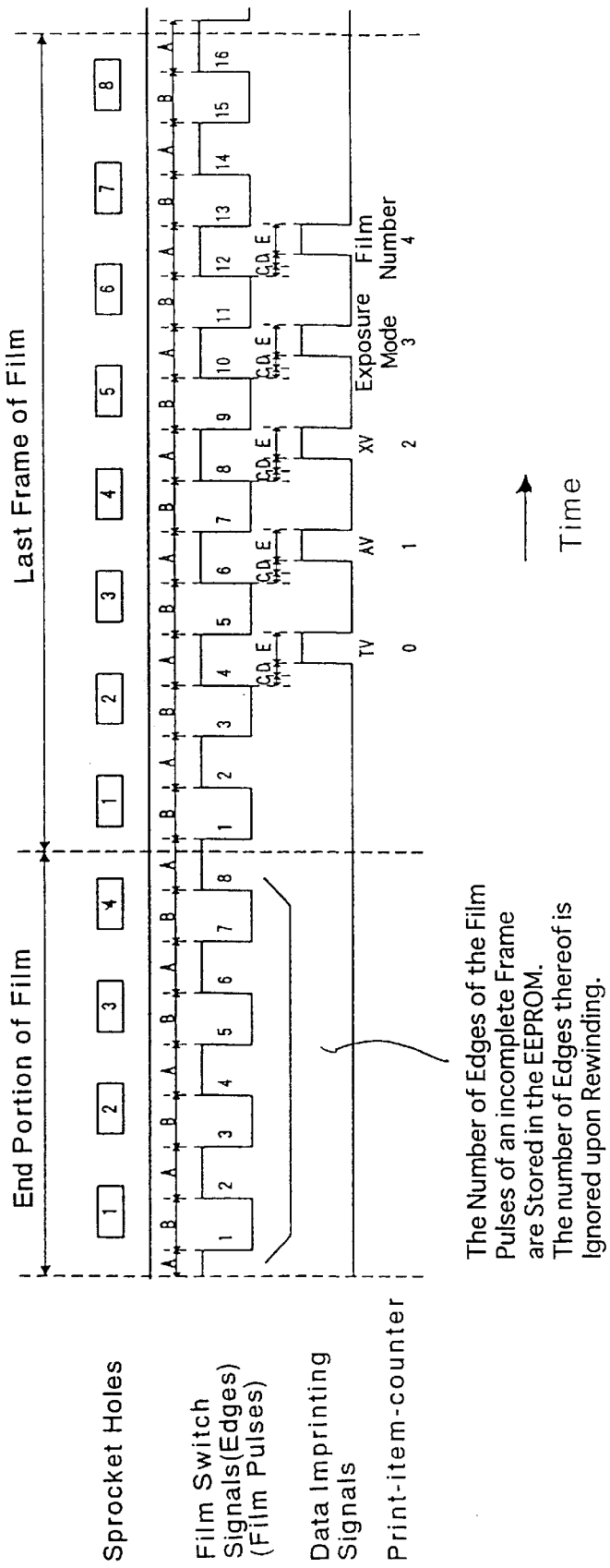
FIG. 14 is a time chart showing a correlation between sprocket holes of film and each film pulse in the camera to which the present invention is applied.

The last frame of the film 14 when fully wound is shown in FIG. 14, as viewed from the underside of the film 14. Upon completion of a photographic operation, it is possible that the film can only be wound out by an amount less than one frame wherein the end portion of the film 14 has been reached, so that no more film can be drawn out from the cartridge FC. The film 14 reaches the end portion thereof upon the film 14 being completely wound, and the last frame of the film 14 becomes the last photographic frame. Accordingly, the last photographic frame is referred to as the final frame, and the number of sprocket holes of the end portion of the film 14 detected from the final frame until the completion of winding of the film 14 is equivalent to the amount of movement of the film 14 from the edge of the. photographic frame to the final edge of the film 14.

FIG. 14 shows a time chart illustrating a correlation between the sprocket holes of the film 14 and each film pulse, in the case of imprinting photographic data on the film 14 between two adjacent sprocket holes thereof upon the film 14 being rewound. The horizontal axis of the time chart represents time. Each film frame FF has eight consecutive sprocket holes on each side of the film 14 (see FIG. 16). Therefore, since photographic data can be imprinted on the film 14 between any two adjacent sprocket holes, there are technically seven areas available for photographic data to be imprinted therein for each film frame FF. However, in the present embodiment, only five different photographic data (Time Value TV, Aperture Value AV, Exposure Compensation Value XV, Exposure Mode and Film Number) are imprinted for each film frame FF (see FIGS. 14 and 16). In each area between two adjacent sprocket holes on the film 14, four characters are imprinted at maximum. Each of the four characters is formed by a matrix of seven dots by five dots. The film 14 moves in the direction from right to left as viewed in FIG. 14 when the film 14 is rewound to be accommodated in the film cartridge FC. Each film switch signal (i.e., the film pulse) shown in FIG. 14 is a low-level/ high-level pulse signal which is generated by the film switch 58 when the two output terminals 28a and 28b thereof are electrically connected and disconnected. The level of the film switch signal varies each time an edge of each sprocket hole passes a predetermined position. The CPU 34 (which function as a common detecting device including the function of a sprocket-hole detecting, device and the function of the above-mentioned film speed detecting device) detects which edge of the sprocket holes of the film 14 has passed the predetermined position by detecting the variation of the level of the film switch signal to thereby detect the positions of the sprocket holes. The data imprinting device starts imprinting photographic data from a position determined in accordance with the positions of the sprocket holes. In FIG. 14, each reference letter "A" represents the duration of the high level of a film pulse, each reference letter "B" represents the duration of the low level, and each reference numeral "E" represents the time necessary for photographic data to be imprinted between two adjacent sprocket holes. In the data imprinting operation, in order to control the data imprinting device to start imprinting photographic data after a predetermined period of time elapses from the moment of detection that the level of the film pulse varies from low to high, a first delay time "C" necessary for converting four characters which are to be imprinted between two adjacent sprocket holes of the film 14 into photographic data, and also a second delay time "D" which is calculated in accordance with the speed of movement of the film 14, are utilized. With these first and second delay times, the position of commencement of data-imprinting between two adjacent sprocket holes can be controlled.

Figure 16A:
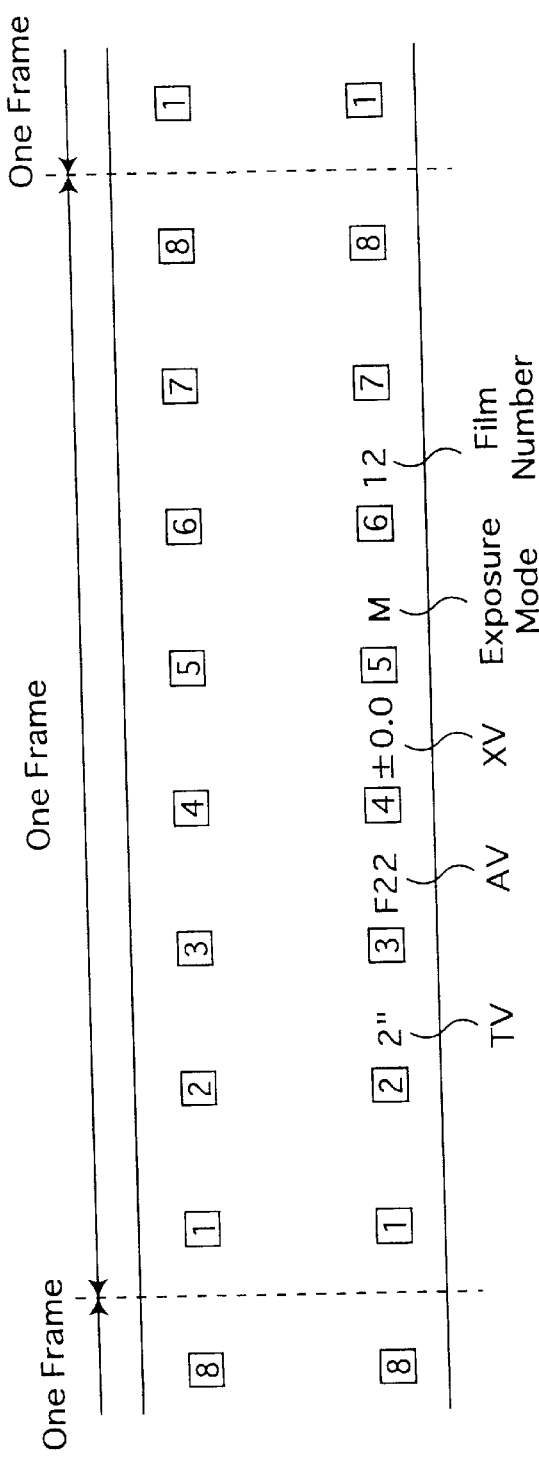
FIGS. 16A and 16B are plan views of part of a roll film on which the-photographic data is imprinted by the data imprinting device of the camera to which the present invention is applied.
Figure 16B:
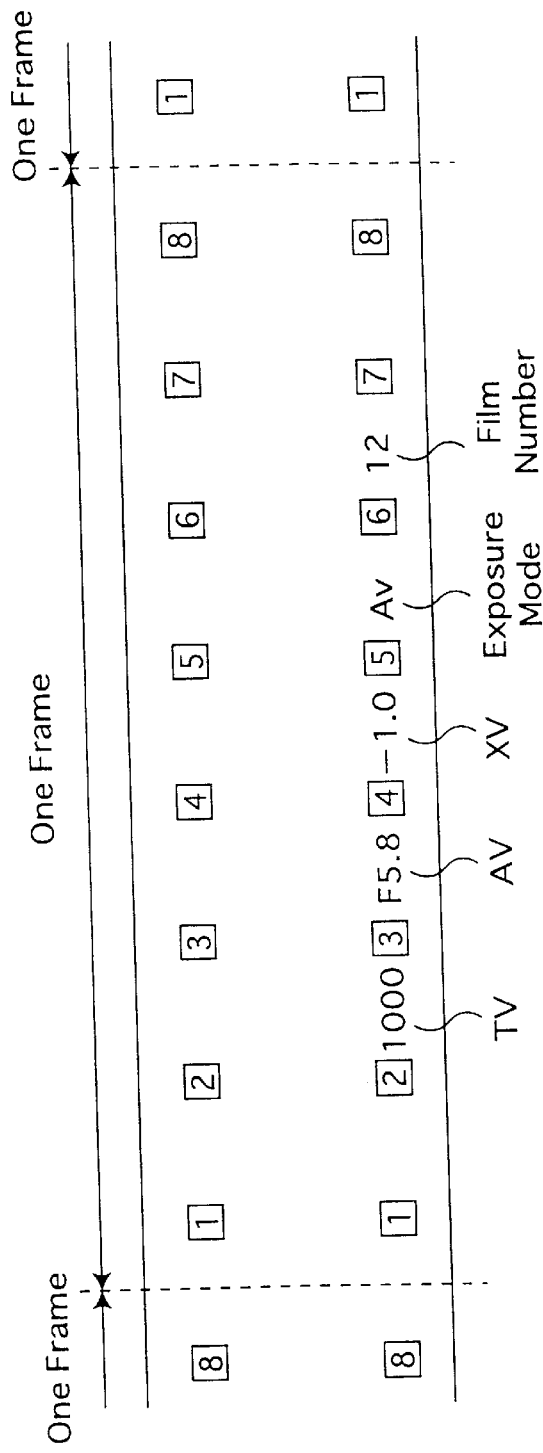

FIG. 15 is an enlarged view of part of the time chart shown in FIG. 14. The data imprinting operation includes an imprinting function wherein, in order to imprint each character formed by a matrix of seven dots by five dots (the matrix constituting one unit of data), the five columns of the matrix (each of which is formed by seven dots) are intermittently imprinted column by column on the film 14 between two adjacent sprocket holes thereof by controlling the character generator 11 to emit light for each column by a data imprinting time (light-emission duration) "G" determined in accordance with the ISO speed information of the film 14 per cycle (data imprinting period) "F" of the pulse signals determined by calculation in accordance with the detected speed of movement of the film 14. The width of each space between two adjacent imprinting characters among the four characters of photographic data is predetermined to correspond to one dot, i.e., one column. Since the data imprinting operation is carried out in such a manner using the cycle "F" of the pulse signals determined by calculation in accordance with the detected speed of movement of the film 14, the width of each character pattern exposed on film is maintained constant. FIGS. 16A and 16B show part of the film 14 on which different photographic data (Time Value TV, Aperture Value AV, Exposure Compensation Value XV, Exposure Mode and Film Number) are imprinted for each film frame by the data imprinting device of the present embodiment of the camera.

FIG. 5 is a block diagram of a control circuit of the present embodiment of the SLR camera. The control circuit is provided with the CPU 34 including ROMs and RAMs therein. The control circuit is further provided with a DC/DC converter 35, a voltage regulator 36, a motor driver IC 38, a mirror drive motor 39, a motor driver IC 40, a film winding/rewinding motor 41, a shutter control circuit 42, a diaphragm control circuit 43, a clock generator 44, a clock IC 45, a photometer IC 46, an AVVR (Aperture Value Variable Resistor) 47, a viewfinder internal LCD 48, an LED 49, an external LCD 50, an EEPROM 51, a data imprinting circuit 52, a DX code identifying circuit 53, and various switches which are all connected to the CPU 34. Note that since the present embodiment of the camera is an SLR camera, the camera is provided in the camera body 21 with a quick-return mirror (not shown) which reflects light passed through the photographic optical system (interchangeable lens) towards the finder optical system immediately before a shutter release. A battery 37 as power supply, which is accommodated in a battery chamber of the camera, is connected to the CPU 34 via the DC/DC converter 35 and the voltage regulator 36. The mirror drive motor 39 and the film winding/rewinding motor 41 which function as drive devices are connected to the CPU 34 via the motor drivers IC 38 and 40, respectively. The shutter control circuit 42, the diaphragm control circuit 43, the data imprinting circuit 52 and the DX code identifying circuit 53 which function as circuit devices are connected to the CPU 34. The data imprinting circuit 52 controls the operation of imprinting photographic data between two adjacent sprocket holes of the film 14. The DX code identifying circuit 53 identifies a DX code printed on the film cartridge FC via the DX-information pins 26. The photometer IC 46 and the AVVR 47 which function as sensor devices are connected to the CPU 34. The photometer IC 46 is used for the automatic exposure control of the camera while the AVVR 47 is used to detect the size of the diaphragm. The viewfinder internal LCD 48 indicates various photographic information in the field of view of the viewfinder. The LED 49 illuminates the LCD 48. The external LCD 50 indicates various photographic information such as the selected photographic mode and film information (the number of remaining frames, ISO speed information, etc.) at an appropriate position on the camera body 21.

A main switch 61 functions as the power switch for the camera. A photometering switch SWS which is turned ON upon the release button of the camera being half depressed, a release switch SWR which is turned ON upon the release button of the camera being fully depressed, the aforementioned film switch 58 for generating film pulses by movement of the film 14, and a data-imprinting permission switch 54 which turns the emission of the character generator 11 ON and OFF are connected to the CPU 34. Furthermore, a back-lid switch 60 for detecting whether the back lid 13 is open or closed, a mirror-up switch 56 for detecting whether the quick-return mirror is positioned at the upper end position (raised position) thereof, a mirror-down switch 55 for detecting whether the quick-return mirror is positioned at the lower end position (initial position) thereof, a mid-roll rewind switch 59, a film cartridge switch 57 for detecting whether the film cartridge FC in is the film chamber 32, are also connected to the CPU 34. The EEPROM 51 stores various photographic data and parameters. The clock generator 44 generates drive clock pulses for the CPU 34. The clock IC 45 counts the time and date.

Figure 6A:
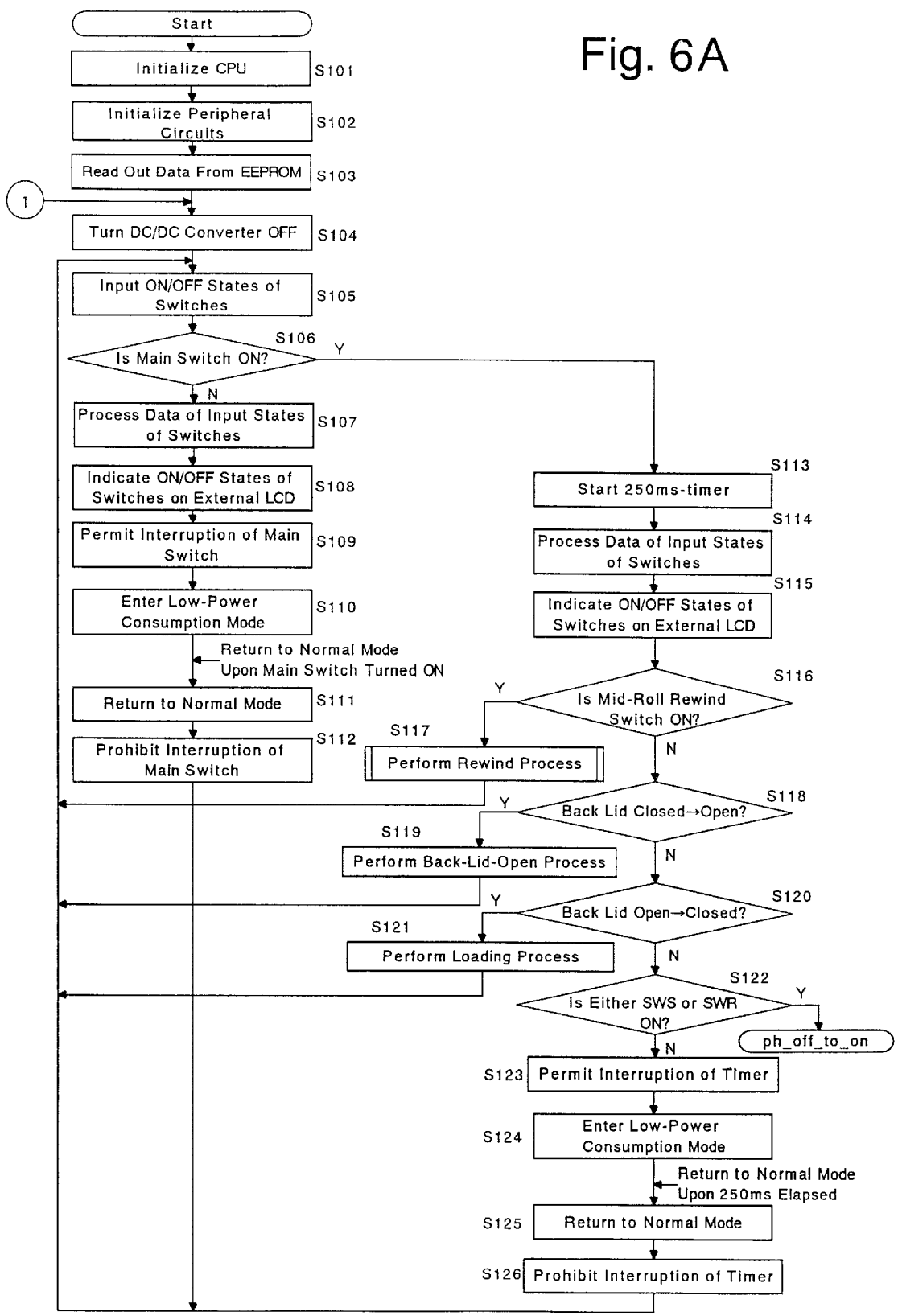
FIG. 6A is a part of a flow chart of the main routine of the camera shown in FIG. 1.
Figure 6:
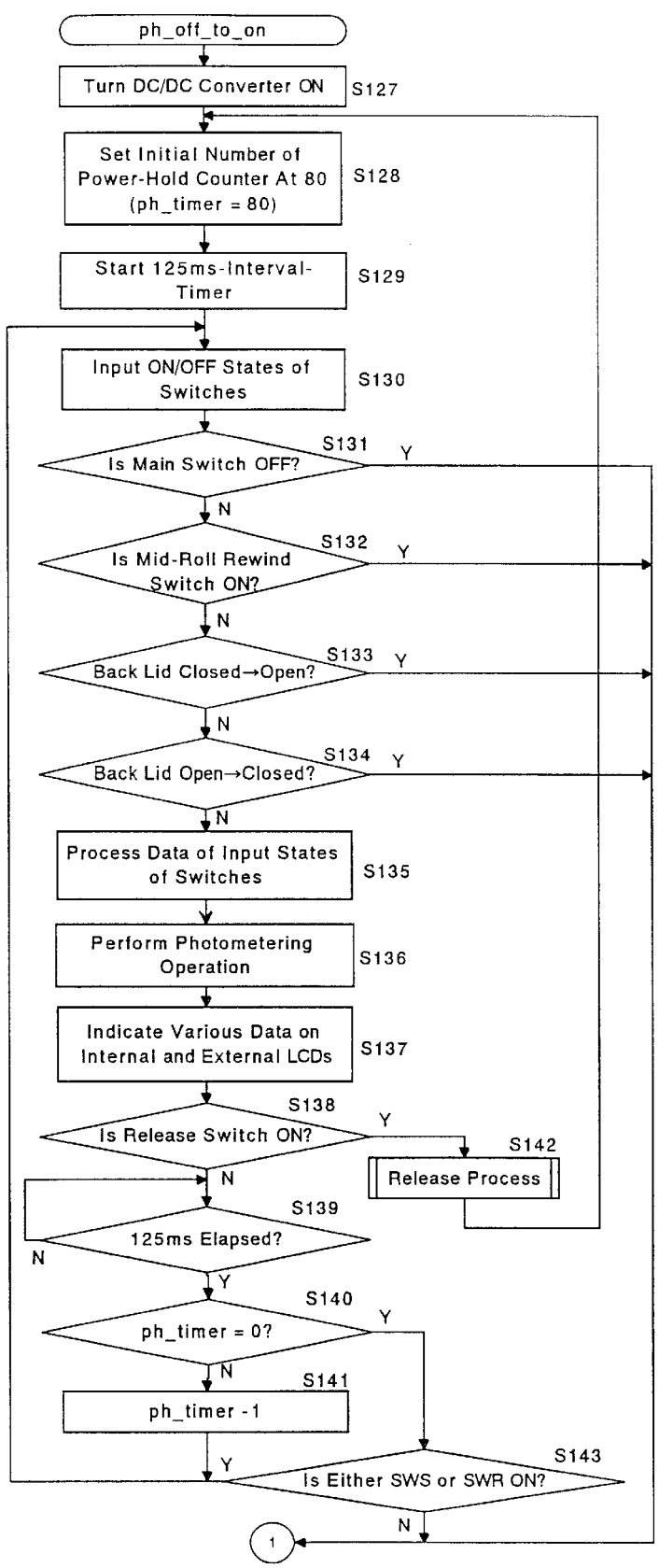
FIG. 6B is a part of a flow chart of the main routine of the camera shown in FIG. 1.

Control of the camera of the present embodiment will be hereinafter discussed with reference to FIGS. 6A and 6B, which shows a flow chart of the main routine of the camera. The CPU 34 performs all the operations and processes contained in the main routine shown in FIGS. 6A and 6B. Control enters the main routine immediately after the battery 37 is loaded into the camera. At first, the CPU 34 and peripheral circuits are initialized (steps S101 and S102). Subsequently, data stored in the EEPROM 51 is read out to be input to the internal RAM of the CPU 34 (step S103), and the DC/DC converter 35 is turned OFF (step S104).

Thereafter, the ON/OFF states of all the switches are input to the CPU 34 (step S105). Subsequently, it is determined whether the main switch 61 is ON (step S106). If it is determined that the main switch 61 is not ON, data of the ON/OFF states of all the switches is processed to be indicated on the external LCD panel 50 (steps S107 and S108). Subsequently, interruption of the main switch 61 is permitted (step.S109), and the camera falls into a low-power consumption mode, i.e., a sleep mode (step S110). The camera returns to a normal mode immediately after the main switch 61 is turned ON (step S111). Thereafter, an interruption of the main switch 61 is prohibited (step S112), control returns to step S105, and the operations from step S105 to step S112 are repeated.

If it is determined at step S106 that the main switch 61 is ON, a 250 ms timer in the CPU 34 starts, in preparation for the photographing process (step S113). Subsequently, data of the ON/OFF states of all the switches which are input to the CPU 34 at step S105 is processed to be indicated on the external LCD panel 50 (steps S114 and S115). Subsequently, it is determined whether the mid-roll rewind switch 59 is ON (step S116). If it is determined that the mid-roll rewind switch 59 is ON this indicates that the mid-roll rewind switch 59 has been depressed, so that the rewind process is performed (step S117). After the rewind process is completed, control returns to step S105. In the rewind process, the data imprinting device operates to imprint photographic data on the film 14. The details of the rewind process will be discussed later. If it is determined at step S116 that the mid-roll rewind switch 59 is OFF, it is determined whether the state of the back lid 13 has changed from a closed state to an open state (step S118). If it is determined that the state of the back lid 13 has changed from a closed state to an open state, the back-lid-open process is performed (step S119) and subsequently control returns to step S105. If it is determined at step S118 that the state of the back lid 13 has not. changed from a closed state to an open state, it is determined whether the state of the back lid 13 has changed from an open state to a closed state (step S120). If it is determined that the state of the back lid 13 has changed from an open state to a closed state, indicating that the film cartridge FC may have been loaded into the camera, the loading process is performed (step S121) and subsequently control returns to step S105. If the back lid 13 remains closed, it is determined whether either the photometering switch SWS or the release switch SWR is ON, i.e., whether the release button is in the state of being half or fully depressed (step S122). If neither switch SWS nor SWR is ON, interruption of the timer is permitted (step S123), and the camera falls into the low-power consumption mode, i.e., the sleep mode (step S124). Thereafter, the camera returns to the normal mode immediately after the 250 ms timer elapses (step S124). Thereafter, interruption of the timer is prohibited (step S126), and control returns to step S105.

If it is determined at step S122 that either the photometering switch SWS or the release switch SWR is ON, i.e., the release button is in the state of being at least half depressed, shown in FIG. 6B, the DC/DC converter 35 is turned ON in preparation for the release process of step S142 (step S127). Subsequently, the initial number of a power-hold counter in the CPU 34 is set to 80 (step S128), and a 125 ms interval timer in the CPU 34 starts (step S129). Namely, after the photometering switch SWS is turned ON, a power-holding time for holding the camera in the normal mode is set to 10 seconds (=80×125(ms)) so that the camera does not fall into the sleep mode until the power-holding time elapses. Thereafter, the ON/OFF states of all the switches are input to the CPU 34 (step S130). Subsequently, it is determined whether the main switch 61 is OFF (step S131). If it is determined at step S131 that the main switch 61 is OFF, it is no longer necessary for the camera to be held in the normal mode, therefore control returns to step S104. If it is determined at step S131 that the main switch 61 is not OFF, it is determined whether the mid-roll rewind switch 59 is ON (step S132). If it is determined that the mid-roll rewind switch 59 is ON, control returns to step S104 in order to perform the rewind operation at step S117. If it is determined at step S132 that the mid-roll rewind switch 59 is not ON, it is determined whether the state of the back lid 13 has changed from a closed state to an open state (step S133). If it is determined that the state of the back lid 13 has changed from a closed state to an open state, control returns to step S104 to perform the back-lid-open process at step S119. If it is determined at step S133 that the state of the back lid 13 has not changed from a closed state to an open state, it is determined whether the state of the back lid 13 has changed from an open state to a closed state (step S134). If it is determined at step S134 that the state of the back lid 13 has changed from an open state to a closed state, control returns to step S104 to perform the loading process at step S121. If the back lid 13 remains closed, data which varies due to the variation of the ON/OFF state of each switch is renewed (step S135). Subsequently, the photometering operation is performed (step S136), and the indicating process for indicating various photographic data on each of the internal and external LCDs 48 and 50 is performed (step S137).

Subsequently, it is determined whether the release switch SWR is ON (step S138), and the release process is performed (step S142) in the case where the release switch SWR is ON. If it is determined at step S138 that the release switch SWR is not ON, it is determined whether the 125 ms of the 125 ms interval timer has elapsed (step S139). The operation at step S139 is repeated until the 125 ms elapses. Immediately after the 125 ms has elapsed, it is determined whether the value of the power-hold timer is zero (step S140). If the value of the power-hold timer is not zero, the number is decreased by one (step S141), and control returns to step S130 so that the operations from step S130 to step S141 are repeated until the value of the power-hold timer is zero. If it is determined at step S140 that the value of the power-hold timer is zero, it is determined whether either the photometering switch SWS or the release switch SWR is ON (step S143). If either switch SWS or SWR is ON, indicating that the release button is still in the state of being at least half depressed, control returns to step S130 in preparation for the release process of step S142. If neither switch SWS nor SWR is ON, control returns to step S104.

Figure 7:
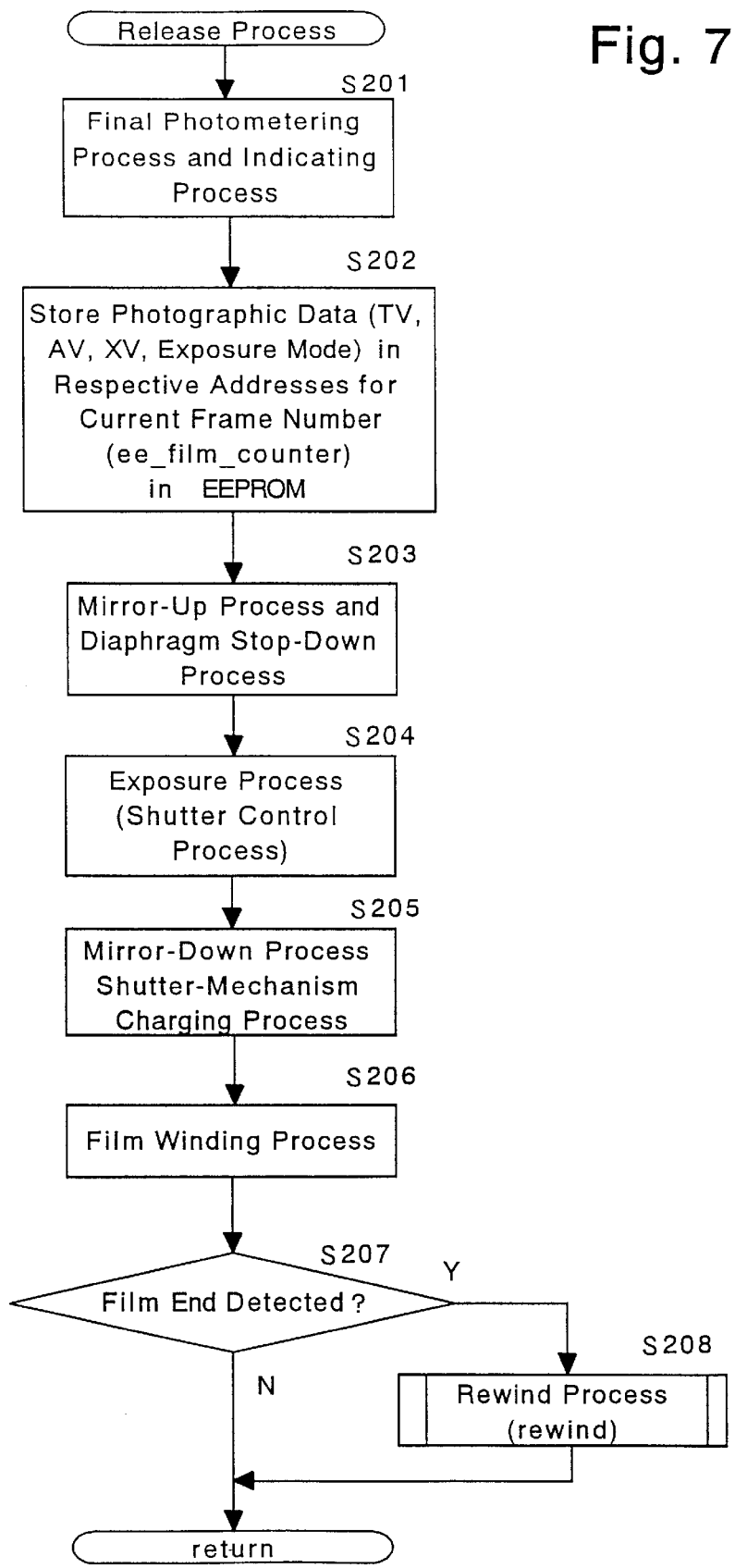
FIG. 7 is a flow chart of the release process of the camera shown in FIG. 1.

The release process performed at step S142 will be hereinafter discussed with reference to FIG. 7 which shows a flow chart thereof. As shown in the release process flow chart, the exposure process, in which the diaphragm and the quick-return mirror are actuated, is performed immediately after the release switch is fully depressed. In the release process, firstly the final photometering process and the indicating process are performed before the shutter is released (step S201). Subsequently, photographic data (Time Value TV, Aperture Value AV, Exposure Compensation Value XV and Exposure Mode) are stored in respective addresses for the current film number in the EEPROM 51 (step S202). Subsequently, the mirror-up process, the diaphragm stop-down process, the exposure process (shutter control process), the mirror-down process and the shutter-mechanism charging process are performed (steps S203, S204 and S205). Thereafter, the film winding process is performed (step S206). Subsequently, it is determined whether the film end is detected (step S207). If the film end is detected, the rewind process is performed (step S208) and control returns, otherwise the rewind process is not performed and control returns.

Figure 8:
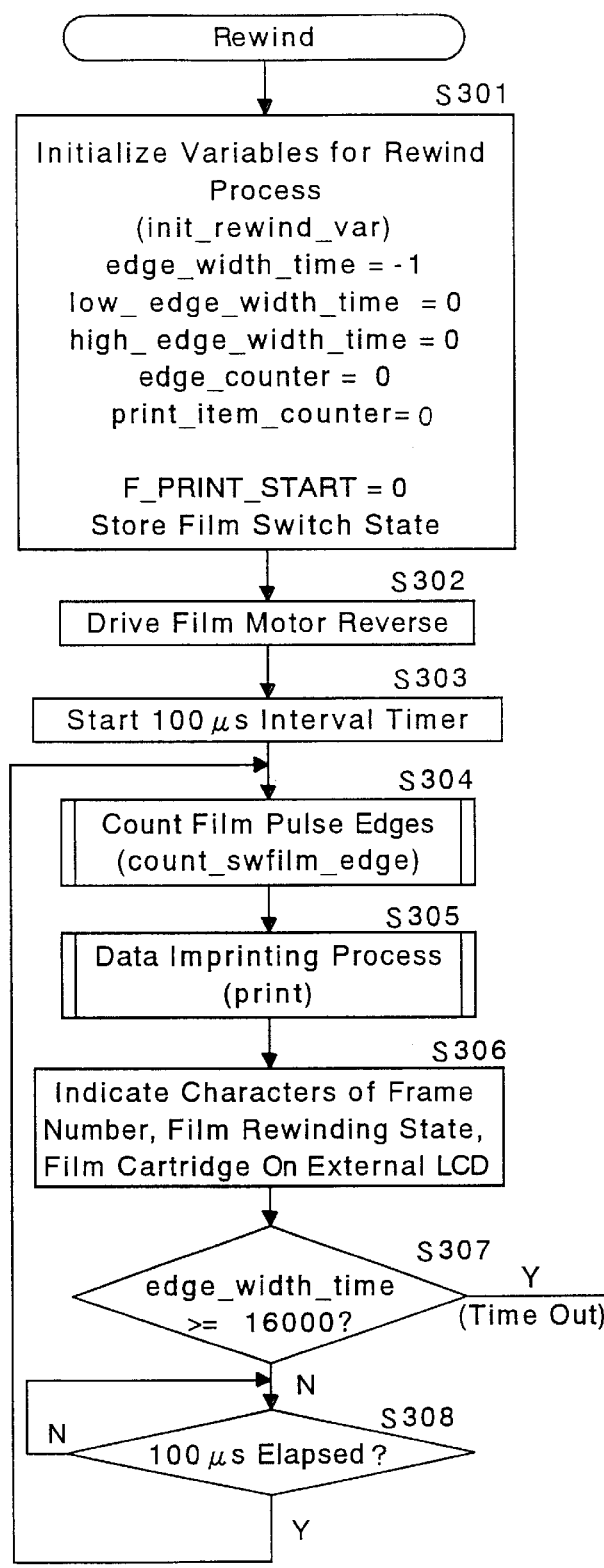
FIG. 8 is a flow chart of the rewinding process of the camera shown in FIG. 1 in which the data imprinting process is performed.

The rewind process performed at steps S117 and S208 will be hereinafter discussed with reference to FIG. 8 which shows a flow chart thereof. In the rewind process, firstly all the variables for the rewind process are initialized while the state of the film switch 58 is stored in the internal RAM of the CPU 34 (step S301). Subsequently, the film winding/rewinding motor 41 is driven to reverse the drive shaft thereof to rewind the film 14 (step S302), and a 100 μs interval timer in the CPU 34 starts (step S303). The 100 μs interval timer defines the period for repeating the operations from step S304 to step S308. Subsequently, the leading and trailing edges (designated by the reference numerals 1 through 16 for each frame as shown in FIG. 14) of the film pulses generated by the movement of the film 14 are counted (step S304). Subsequently, the data imprinting process is performed (step S305), and a character or characters showing the number of film frame and/or a character having the shape of a film cartridge FC are indicated on the external LCD 50 to inform the user that the film 14 is now being rewound (step S306). Subsequently, it is determined whether the total counted number of a pulse-width measuring counter (edge_width_time) in the CPU 34 that is used for measuring a half of the period of the film pulse is over 16,000, i.e., whether 1.6 seconds has elapsed since the aforementioned 100 μs interval timer started (step S307). If it is determined at step S307 that 1.6 seconds has not yet elapsed, it is determined whether 100 μs has elapsed (step S308). The operation at step S308 is repeated until 100 μs has elapsed thereat. If it is determined at step S308 that 100 μs has elapsed, control returns to the process at step S304. Accordingly, the operations from step S304 to S308 are repeated until it is determined at step S307 that 1.6 seconds has elapsed since the aforementioned 100 μs interval timer started. The number of the pulse-width measuring counter (edge_width_time) increases by one every time 100 μs elapses.

If it is determined at step S307 that 1.6 seconds has elapsed without any variation of the film pulses' level, indicating that the film 14 has been completely rewound, the power supply to the film winding/rewinding motor 41 is stopped in order to stop the film winding/rewinding motor 41 (step S309), and the film winding/rewinding motor 41 is freed from control (step S310). Subsequently, it is determined whether a normal-loading completion (F_LOAD_OK) is 1 (step S311). If the normal-loading completion (F_LOAD_OK) is 1, indicating that the film cartridge FC has been loaded in the camera, a serial number (ee_film_no) which shows the serial number of the film cartridge FC is increased by one and stored in the EEPROM 51 (step S312). If it is determined at step S311 that the normal-loading completion (F_LOAD_OK) is not 1, control skips the operation at step S312. A film-end-edge counter (ee_film_end_edge), which indicates the number of edges of the film pulses generated within the last inch of the film 14 from the trailing edge of the last frame to the film end, and a filmframe-number counter (ee_film_counter) are each set to 0 and these values are stored in the EEPROM 51 (steps S313 and S314). Subsequently, the normal-loading completion flag (F_LOAD_OK), a film end flag (F_FILM_END) and a rewind end flag (F_REW_END) are set to 0, 0 and 1, respectively, and stored in the EEPROM 51 (step S315). Thereafter control returns.

Figure 9:
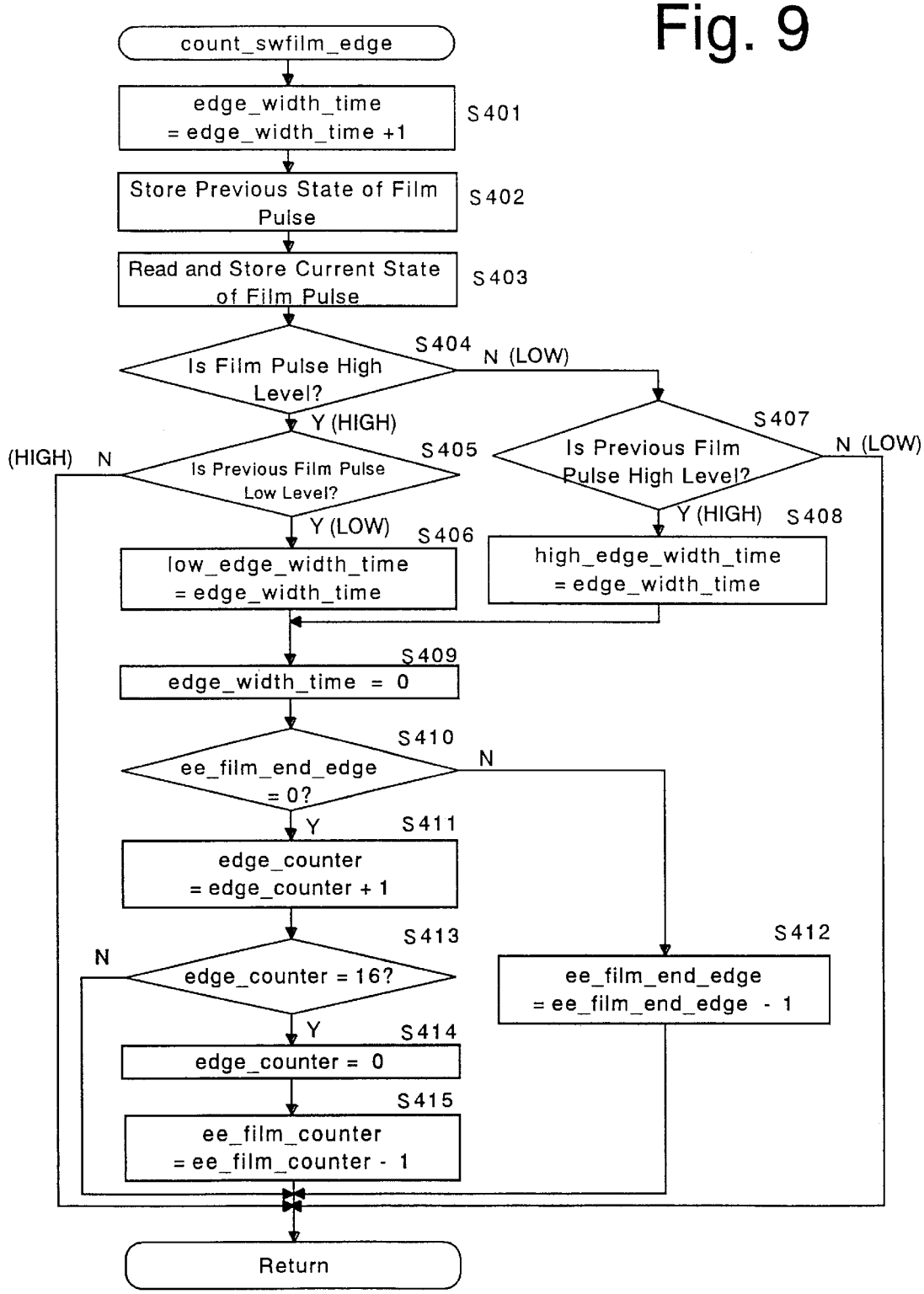
FIG. 9 is a flow chart of a sub-routine in the flow chart shown in FIG. 8.

The process at step S304 in which the leading and trailing edges of the film pulses generated by the movement of the film 14 are counted will be hereinafter discussed with reference to FIG. 9. In this process, the state of the film pulse (i.e., whether the level of the film pulse is low or high) is detected every 100 μs to measure the numerical value shown by the pulse-width measuring counter (edge_width_time), i.e., the period of time from the moment the state of the film pulse changes to the subsequent moment the state of the film pulse changes. In this process, firstly, the pulse-width measuring counter (edge_width_time) is increased by one (step S401). Subsequently the previous state (low level or high level) of the film pulse is stored (e.g., in a register), and the current state of the film pulse is read out to be stored (e.g., in a register) (steps S402 and S403). Subsequently, it is determined whether the level of the current film pulse is high (step S404). If it is detected at step S404 that the level of the current film pulse is high, it is determined whether the level of the previous film pulse is low (step S405). If it is detected at step S405 that the level of the previous film pulse is not low, indicating that the level of the film pulse remains high, the control returns. If it is detected at step S405 that the level of the previous film pulse is low, indicating that the leading edge of film pulse has been detected, the value of the pulse-width measuring counter (edge_width_time) at this moment is stored as a low-pulse width or low-pulse duration (low_edge_width_time) (step S406).

Subsequently, the pulse-width measuring counter (edge_width_time) is set to 0 in order to measure the duration of the high level of the film pulse (step S409). Subsequently, it is determined whether the film-end-edge counter (ee_film_end_edge) is 0 (step S410). If it is determined that the film-end-edge counter (ee_film_end_edge) is not 0, indicating that the counting the leading and trailing edges of the film pulses generated at the end of the film 14 (i.e., end portion of less than one film frame) has not yet completed, the film-end-edge counter (ee_film_end_edge) is decreased by 1 (step S412), and control returns. If it is determined at step S410 that the film-end-edge counter (ee_film_end_edge) is 0, an edge counter (edge_counter) for counting the leading and trailing edges of the film pulses in the direction Of rewinding the film 14 is increased by 1 (step S411). Subsequently, it is determined whether the edge counter (edge_counter) is 16 (step S413). If the edge counter (edge_counter) is not 16, control returns. If the edge counter (edge_counter) is 16, indicating that eight sprocket holes for one film frame has passed, the edge counter (edge_counter) is set to 0 to start counting the leading and trailing edges of the film pulses generated by the sprocket holes of the subsequent film frame. Subsequently, the film-frame-number counter (ee_film_counter) is decreased by 1 (step S415), and control returns.

If it is detected at step S404 that the level of the current film pulse is not high, it is determined whether the level of the previous film pulse is high (step S407). If the level of the previous film pulse is not high, indicating that the level of the film pulse remains low, the control returns. If the level of the previous film pulse is high, indicating that the trailing edge of film pulse has been detected, the pulse-width measuring counter (edge_width_time) at this moment is stored as a high-pulse width or high-pulse duration (high_edge_width_time) (step S408) and subsequently control proceeds to step S409.

Figure 10:
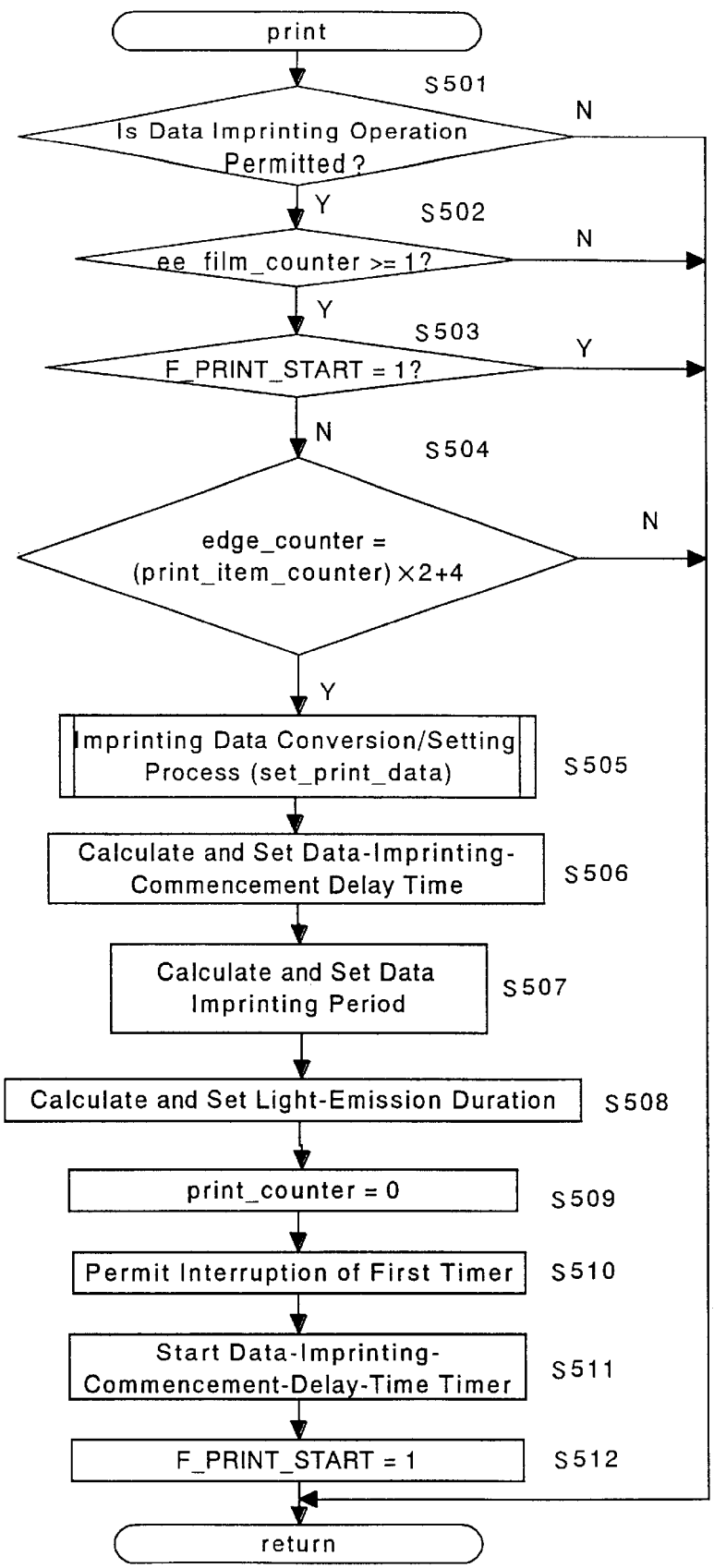
FIG. 10 is a flow chart of the data imprinting process shown in FIG. 8.

The data imprinting process performed at step S305 will be hereinafter discussed with reference to FIGS. 10, 14 and 15. FIG. 10 shows a flow chart of the data imprinting process. In the data imprinting process, firstly it is determined whether the data imprinting operation, in which photographic data is imprinted on the film 14, is permitted by checking the ON/OFF state of the data-imprinting permission switch 54 (step S501). If it is determined that the data imprinting operation is not permitted, it is not necessary to imprint any data on the film 14, and control returns. If it is determined that the data imprinting operation is permitted, it is determined whether the film-frame-number counter (ee_film_counter) is 1 or more (step S502). If the film-frame-number counter (ee_film_counter) is less than 1, control returns. If the film-frame-number counter (ee_film_counter) is 1 or more, it is determined whether the data-imprinting-start flag (F_PRINT_START) is 1, i.e., whether the data imprinting operation is now in operation (step S503). If it is determined that the dataimprinting-start flag (F_PRINT_START) is 1, control returns. If it is determined that the data-imprinting-start flag (F_PRINT_START) is not 1, it is determined whether the edge counter (edge_counter) satisfies the following equation (step S504):

edge_counter = (print_item_counter)×2+4;
wherein "print_item_counter" represents the number which indicates the order of the imprinting data item for each film frame.

For instance, in FIG. 14, in the case where AV (Aperture Value) data is imprinted on the film 14 between the third sprocket hole and the fourth sprocket hole, "edge_counter" is equal to six because "print_item_counter" is 1. Namely, AV data is imprinted on the film 14 between the third sprocket hole and the fourth sprocket hole after six edges of the film pulses are counted. If it is determined at step S504 that the edge counter (edge_counter) does not satisfy the aforementioned equation, control returns. If the edge counter (edge_counter) satisfies the aforementioned equation, the imprinting data conversion/setting process is performed (step S505). In the imprinting data conversion/setting process, the photographic data stored in the EEPROM 51 at step S202 is converted into actual data which is to be imprinted on the film 14. This converted data is prepared for being imprinted on the film 14 in the operation of step S604 (see FIG. 11). The details of the imprinting data conversion/setting process will be discussed later.

After the imprinting data conversion/setting process, a data-imprinting-commencement delay time and a data imprinting period (the cycle "F" as shown in FIG. 15) are determined by calculation (steps S506 and S507). The data-imprinting-commencement delay time is determined at step S506 using the following equation:

Data-imprinting-commencement delay time = Reference delay time×(measured high-pulse duration/reference high-pulse duration).

Reference delay time corresponds to the sum of the first and second delay times "C" and "D" shown in FIG. 14, and hence is adjusted in order to derive the data-imprinting-commencement delay time, so that photographic data starts to be imprinted from a predetermined position at a predetermined reference film speed. Reference high-pulse duration corresponds to the high pulse width (high_edge_width_time) at the predetermined reference film speed. Measured high-pulse duration corresponds to the high-pulse width (high_edge_width_time) at step S408. The first and second delay times, which constitute the Reference Delay Time, and reference high-pulse duration are predetermined and are stored in the EEPROM 51.

The data imprinting period is determined at step S507 using the following equation:

data imprinting period=Reference Period×(measured high-pulse duration/reference high-pulse duration).

Reference Period is determined so as to keep the width of each imprinted character pattern exposed on film constant at the predetermined reference film speed. Measured high-pulse duration corresponds to the high-pulse width (high_edge_width_time) at step S408. Reference Period and reference high-pulse duration are predetermined and are stored in the EEPROM 51.

The position of commencement of imprinting character patterns on the film 14 between two adjacent sprocket holes thereof and also the width of each imprinting character can be easily adjusted by changing Reference Delay Time and Reference Period which are stored in the EEPROM 51.

After the operation at step S507, the light-emission duration ("G" shown in FIG. 15) of the character generator 11 for each column of a matrix of seven dots by five dots is determined in accordance with the ISO speed information of the film 14 (step S508). Subsequently, a data-imprinting-dot counter (print_counter) is set to 0 (step S509). The data-imprinting-dot counter represents the number of columns (0 through 22nd as shown in FIG. 15) of characters imprinted on the film 14 between two adjacent sprocket holes thereof.

Subsequently, interruption of a data imprinting period timer (i.e. first timer) is permitted (step S510). The first timer makes an interruption every "F" period passed to turn on imprint LED (as described later). A data-imprinting-commencement-delay-time timer which delays the commencement of data-imprinting between two adjacent sprocket holes by the data-imprinting-commencement delay time determined in the operation at step S506 starts (step S511), and the data-imprinting-start flag (F_PRINT_START) is set to 1 (step S512). Thereafter, control returns.

Figure 11:
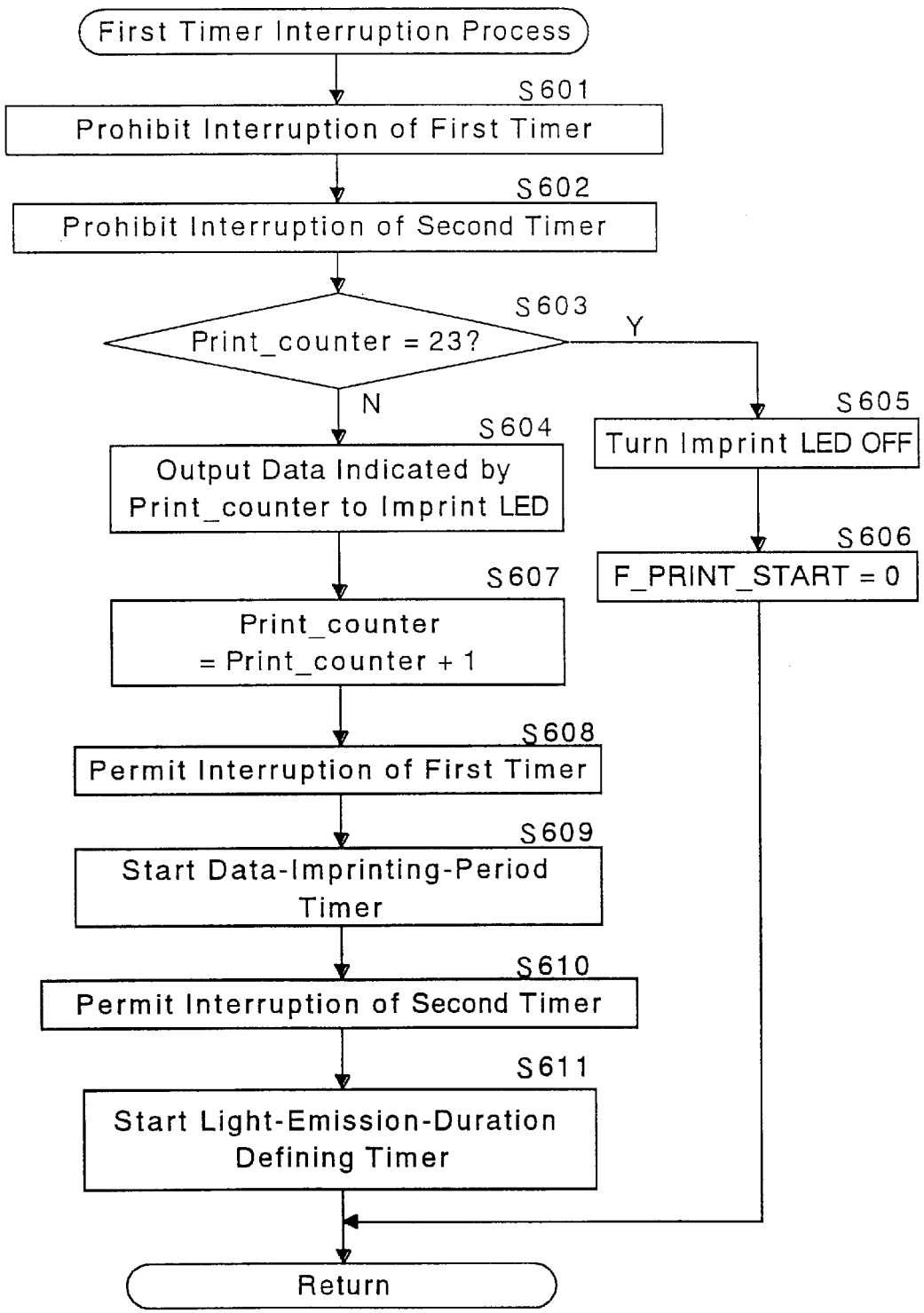
FIG. 11 is a flow chart of the first-timer interruption process.

The first-timer interruption process will be hereinafter discussed with reference to FIG. 11 which shows a flow chart thereof. This subroutine is an interruption routine which allows the character generator 11 emit light to imprint data after interruption of the first timer is permitted at step S510 shown in FIG. 10. In the first timer interruption process, firstly, interruption of the first timer is prohibited (step S601) and interruption of a light emission duration defining timer (i.e. second timer) is also prohibited (step S602). The second timer makes interruption every "G" period passes to turn off imprint LED. Subsequently, it is determined whether the data-imprinting-dot counter (print_counter) is 23 (step S603). In the present embodiment, a maximum of four characters can be imprinted in each area between two adjacent sprocket holes on the film 14 (see FIG. 15) while each character is formed by a matrix of seven dots by five dots, namely, five columns each consisting of seven dots. Between two adjacent characters there is a space corresponding to one column, so that the width of four characters imprinted in the area between two adjacent sprocket holes corresponds to twenty three columns or dots. Accordingly, for each photographic data imprinted on the film 14 between two adjacent sprocket holes thereof, all the twenty three columns are checked one by one.

If it is determined at step S603 that the data-imprinting-dot counter (print_counter) is 23, indicating that the data-imprinting operation for an area between two adjacent sprocket holes is completed, the character generator 11 is turned OFF (step S605), and subsequently the data-imprinting-start flag (F_PRINT_START) is set to 0 (step S606) and control returns. If it is determined at step S603 that the data-imprinting-dot counter (print_counter) is not 23, the character generator 11 is actuated to emit light in accordance with that corresponding data of the converted data obtained in the operation at step S505 which corresponds to the number indicated by the data-imprinting-dot counter (print_counter) (step S604).

Subsequently, the data-imprinting-dot counter (print_counter) is increased by one (step S607), and interruption of the first timer is permitted (step S608). Subsequently, a timer (data-imprinting-period timer) for defining the data imprinting period ("F" shown in FIG. 15) determined in the operation at step S507 starts (step S609), and interruption of the second timer is permitted (step S610). Subsequently, the timer for defining the lighte-mission duration ("G" shown in FIG. 15) starts (step S611), and control returns.

Figure 12:
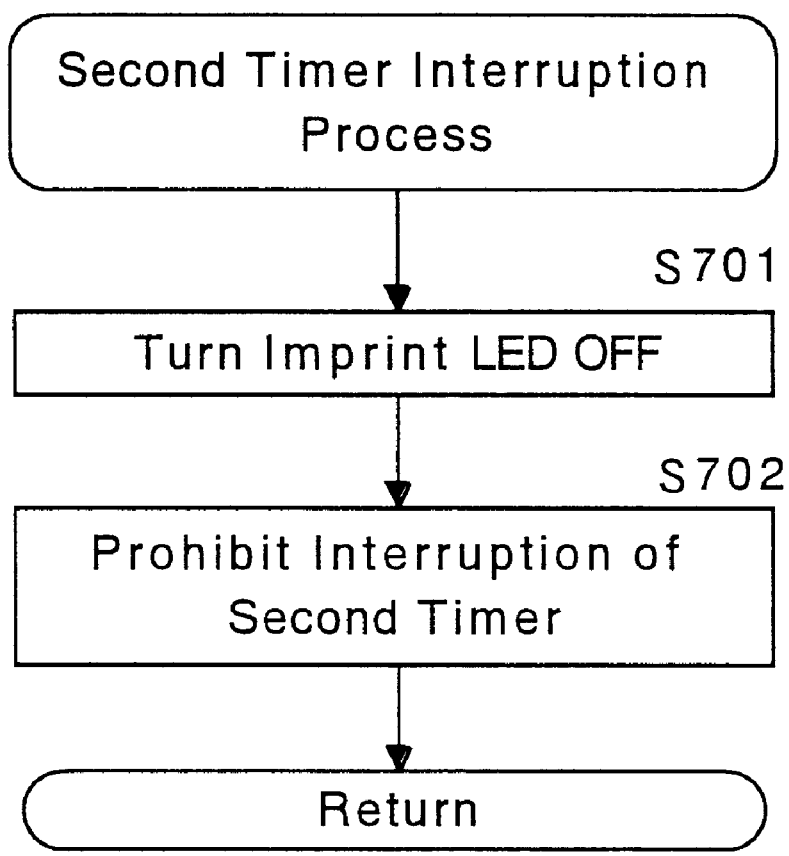
FIG. 12 is a flow chart of the second-timer interruption process.

The second-timer interruption process will be hereinafter discussed with reference to FIG. 12 which shows a flow chart thereof. this subroutine is an interruption routine for having the character generator 11 stop emitting light after the character generator 11 starts emitting light in the subroutine of the first-timer interruption process. In the second-timer interruption process, firstly the character generator 11 is turned OFF (step S701) and subsequently interruption of the second timer is prohibited (step S702). Thereafter control returns.

Figure 13:
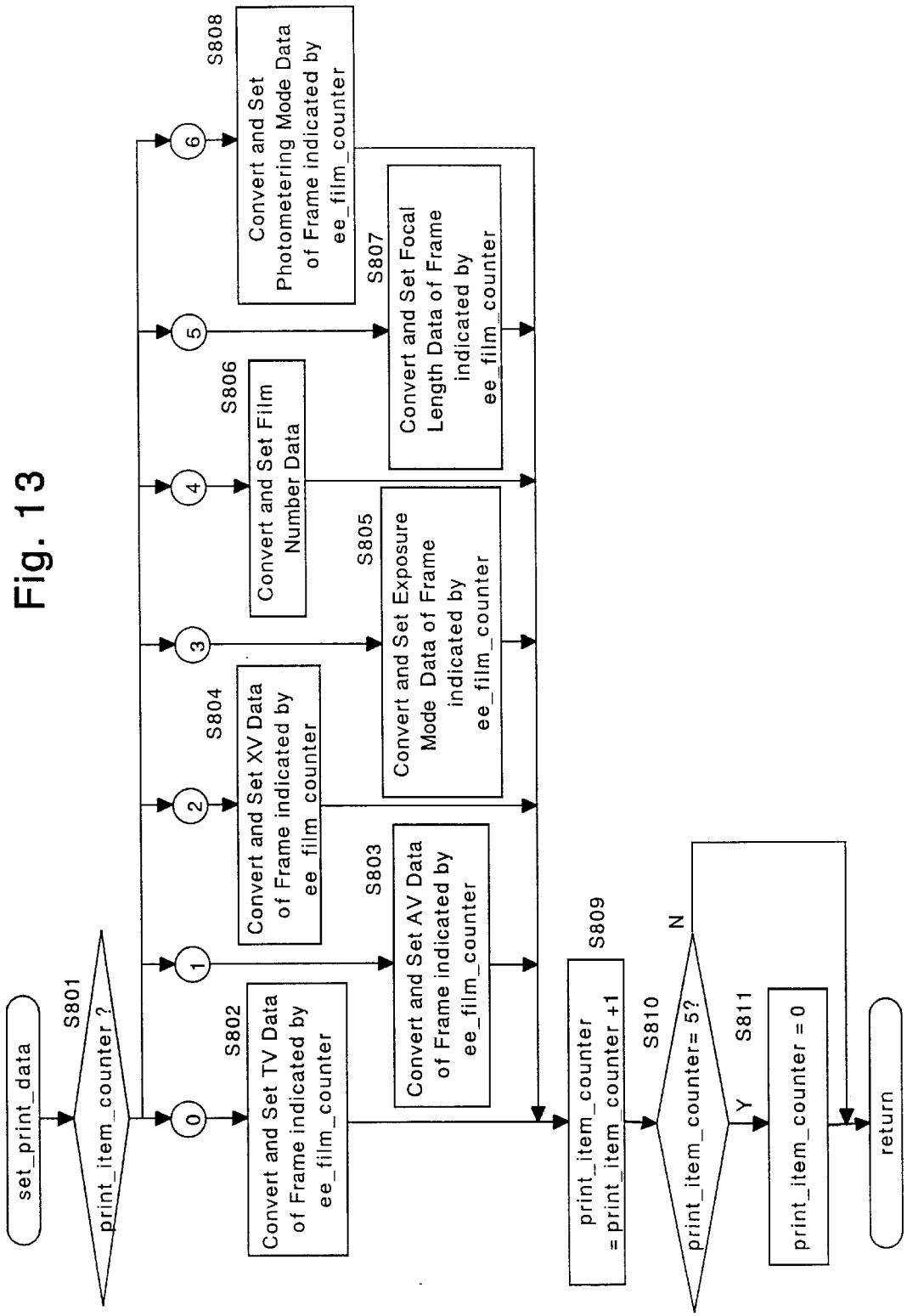
FIG. 13 is a flow chart of the imprinting data conversion/setting process shown in FIG. 10.

The imprinting data conversion/setting process at step S505 will be hereinafter discussed with reference to FIG. 13 which shows a flow chart thereof. In this process, firstly the data-item counter (print_item_counter) is checked (step S801). If the data-item counter is 0, TV (Time Value) data of the film frame indicated by the filmframe-number counter (ee_film_counter) in the photographic data stored in the EEPROM 51 at step S202 is converted and prepared for being imprinted on the film 14 (step S802). If the data-item counter is 1, similar to the case where the data-item counter is 0, AV (Aperture Value) data of the film frame indicated by the film-frame-number counter (ee_film_counter) in the photographic data stored in the EEPROM 51 at step S202 is converted and prepared for being imprinted on the film 14 (step S803). Likewise, if the data-item counter is 2, XV (Exposure Compensation Value) data of the film frame indicated by the film-frame-number counter (ee_film_counter) in the photographic data stored in the EEPROM 51 at step S202 is converted and prepared for being imprinted on the film 14 (step S804). Likewise, if the data-item counter is 3, Exposure Mode data of the film frame indicated by the film-frame-number counter (ee_film_counter) in the photographic data stored in the EEPROM 51 at step S202 is converted and prepared for being imprinted on the film 14 (step S805). Likewise, if the data-item counter is 4, Film Number data in the photographic data stored in the EEPROM 51 at step S202 is converted and prepared for being imprinted on the film 14 (step S806).

If the data-item counter is 5, Focal length data of the film frame indicated by the film-frame-number counter (ee_film_counter) in the photographic data stored in the EEPROM 51 at step S202 is converted and prepared for being imprinted on the film 14 (step S807). If the data-item counter is 6, Photometering Mode data of the film frame indicated by the film-frame-number counter (ee_film_counter) in the photographic data stored in the EEPROM 51 at step S202 is converted and prepared for being imprinted on the film 14 (step S808). In the illustrated embodiment shown in FIGS. 14 and 16, the number of imprinting data items (ee_num_print_item) and the number of the leading or trailing edges (ee_print_trig_edge) are set to 5 and 4, respectively, so that neither Focal length data in the case of the data-item counter being 6 nor Photometering Mode data in the case of the data-item counter being 7 is imprinted on the film 14 in the illustrated embodiment shown in FIGS. 14 and 16.

Upon the various data being converted/set at any one of steps S802 through S808, the data-item counter (print_ item_counter) is incremented by one in order to perform the imprinting data conversion/setting process for the subsequent data item (step SS809) If the imprinting data-item counter (print_item_counter) is not "5", control is returned since there is still data to be imprinted (S810; N). Subsequently, when the imprinting data-item counter (print_item_counter) reaches "5" (S810; Y), no further imprinting is performed, the imprinting data-item counter (print_item_counter) is set to "0" (5811), and control returns.

Furthermore, FIGS. 14 and 16 show the case wherein the number of items to imprinted is 5, so that the focal length data (print_item_counter="5") and the photometering mode data (print_item_counter ="6") are not imprinted. In order to imprint this data, the imprinting data-item counter (print_item_counter) value (limit) for the condition at step S810 at can be set to "7". This imprint data-item counter (print_item_counter) value is stored in the EEPROM 51, and can be altered via a predetermined operation.

According to the present embodiment, the position of commencement of imprinting character patterns on the film 14 between two adjacent sprocket holes thereof, and also the width of each imprinting character, can be easily adjusted by changing parameters such as Reference Delay Time, Reference Period and the number of imprinting data items (ee_num_print_item) which are stored in the EEPROM 51. Accordingly, if a device such as a switch mechanism for rewriting the data stored in the EEPROM 51 is provided within the camera body 21, the parameters such as Reference Delay Time, Reference Period and the number of imprinting data items can be easily changed without having to carry out any troublesome mechanical adjusting operation, which is generally necessary during the assembly of a conventional camera having a data imprinting device. Furthermore, the camera can be provided on the camera body 21 with a device such as a switch mechanism for rewriting the data stored in the EEPROM 51 so that the user can rewrite parameters stored in the EEPROM 51.

In the present embodiment, although the photographic data is imprinted on film at the time of rewinding the film, the photographic data can be imprinted on film at the time of winding the film.

In the present embodiment, although the photographic data is imprinted on film between two adjacent sprocket holes, the present invention can be applied to the case where the photographic data is imprinted on film in any other area.

As can be understood from the foregoing, since the camera is provided with a controller (i.e., the CPU 34) which controls the position of commencement of imprinting the photographic data on film between two adjacent sprocket holes and also a device which keeps the width of each imprinted character pattern exposed on film constant, not only the width of each imprinted character pattern exposed on film is constant but also the position of imprinting character patterns on film between two adjacent sprocket holes thereof is always the same. Furthermore, the position of commencement of imprinting character patterns on film between two adjacent sprocket holes thereof and also the width of each imprinting character can be easily adjusted since parameters necessary for controlling the data imprinting operation are stored in an non-volatile memory such as an EEPROM.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera comprising:
    a sprocket-hole detecting device that detects, with respect to each sprocket hole, a time when each consecutive sprocket hole of a film passes a predetermined position while the film is wound or rewound, when the film is in the camera;
    a data imprinting device that imprints data on said film between two adjacent sprocket holes of the film and out of a picture frame of the film;
    a film speed detecting device that detects the speed of the film; and
    a controller that controls a position of commencement of imprinting said data on the film between said two adjacent sprocket holes in accordance with the time of detection by said sprocket-hole detecting device and said film speed detected of said film speed detecting device.

2. The camera according to claim 1, wherein said film speed detecting device detects said film speed in accordance with a time interval between two adjacent sprocket holes detected by said sprocket-hole detecting device.

3. The camera according to claim 1, wherein said controller utilizes a first delay time and a second delay time in order to control said commencement position of imprinting said data;
    said first delay time comprising the amount of time necessary for converting a predetermined number of characters which are to be imprinted between said two adjacent sprocket holes;
wherein the sum of said first and second delay times determines a reference delay time.

4. The camera according to claim 1, wherein said controller utilizes a refernce delay time in order to control said commencement position of imprinting said data; wherein said delay time is longer than a time comprising the amount of the time necessary for converting a predetermined number of characters which are to be imprinted between sid two adjacent sprocket holes.

5. The camera according to claim 4, wherein said reference delay time is adjusted according to the ratio of said film speed detected by said film speed detecting device and a predetermined reference film speed.

6. The camera according to claim 4, wherein said controller controls said commencement position of imprinting said data in accordance with one of a plurality of edges of consecutive sprocket holes of said film which is detected by said film speed detecting device.

7. The camera according to claim 5, wherein said one of said consecutive edges is one of the two edges of an area on said film between a first sprocket hole and a second sprocket hole immediately before an area in which said data starts to be imprinted on said film between said second sprocket hole and a third sprocket hole.

8. The camera according to claim 4, further comprising a non-volatile memory in which data of said predetermined reference film speed and data of said reference delay time are stored.

9. The camera according to claim 1, wherein said imprinting device comprises an imprinting function wherein a unit of data which is to be imprinted on said film is divided into a plurality of columns, wherein said plurality of columns are imprinted column by column on said film between said two adjacent sprocket holes along a direction of movement of said film.

10. The camera according to claim 9, wherein said data is imprinted on said film when said film is being rewound.

11. The camera according to claim 9, wherein said plurality of columns of said unit of data are imprinted on said film, column by column, periodically at a predetermined period in accordance with said film speed.

12. The camera according to claim 11, wherein said predetermined period is based on a reference period at said predetermined reference film speed and said film speed 0detected by said film speed detecting device.

13. The camera according to claim 12, further comprising a non-volatile memory in which data of said reference period is stored.

14. The camera according to claim 1, wherein a plurality of data is imprinted with respect to each frame of the film by said data imprinting device, each of said plurality of data being imprinted in a corresponding area between corresponding two adjacent sprocket holes with respect to said each frame by said data imprinting device.

15. The camera according to claim 14, further comprising a non-volatile memory in which data of the a data-imprinting trigger edge on each frame of said film and data of the number of areas in which said plurality of data are respectively imprinted are stored.

16. The camera according to claim 1, wherein said data imprinting device comprises an LED light emitter having an array of multiple-dots.

17. The camera according to claim 1, further comprising a sprocket which is provided on at least one end thereof with a plurality of projections extending radially and outwardly at regular intervals, wherein at least one of said plurality of projections being engaged with any of said sprocket holes of the film at any time;

wherein each of said sprocket-hole detecting device and said film speed detecting device comprises a common detector for detecting rotation of said sprocket.

18. The camera according to claim 3, wherein said second delay time is determined in accordance with a reference delay time which is determined so that said data starts to be imprinted from a predetermined position on said film between said two adjacent sprocket holes at a predetermined reference film speed, and a ratio of said film speed detected by said film speed detecting device to said predetermined reference film speed.

19. The camera according to claim 1, wherein said data imprinting device imprints plural types of information, each of said types of information being imprinted between a predetermined pair of adjacent sprocket holes.

20. The camera according to claim 3, said second delay time being related to the detected speed of the film.

* * * * *